(12) United States Patent
Shen

(10) Patent No.: US 12,035,805 B2
(45) Date of Patent: Jul. 16, 2024

(54) CABINETS, CABINET ASSEMBLY SYSTEMS AND METHODS OF CABINET CONSTRUCTION

(71) Applicant: Shiyuan Shen, Richmond (CA)

(72) Inventor: Shiyuan Shen, Richmond (CA)

( * ) Notice: Subject to any disclaimer, the term of this patent is extended or adjusted under 35 U.S.C. 154(b) by 0 days.

(21) Appl. No.: 17/586,556

(22) Filed: Jan. 27, 2022

(65) Prior Publication Data

US 2022/0248841 A1    Aug. 11, 2022

(30) Foreign Application Priority Data

Feb. 8, 2021    (CA) ...................................... 3108473

(51) Int. Cl.
*A47B 47/00*    (2006.01)

(52) U.S. Cl.
CPC .. *A47B 47/0075* (2013.01); *A47B 2230/0077* (2013.01); *A47B 2230/01* (2013.01)

(58) Field of Classification Search
CPC ........ A47B 47/0075; A47B 2230/0077; A47B 2230/01
USPC ............................................. 312/263, 348.3
See application file for complete search history.

(56) References Cited

U.S. PATENT DOCUMENTS

| 2,950,158 | A |   | 8/1960  | Harmon |             |
|-----------|---|---|---------|--------|-------------|
| 3,634,983 | A | * | 1/1972  | Welch  | A47B 19/04  |
|           |   |   |         |        | 211/90.01   |
| 4,013,254 | A | * | 3/1977  | Boundy | A47B 96/1416 |
|           |   |   |         |        | 248/221.12  |
| 4,178,047 | A | * | 12/1979 | Welch  | F16B 12/22  |
|           |   |   |         |        | 312/265.5   |
| 5,152,593 | A |   | 10/1992 | Domenig |            |
| 5,222,611 | A | * | 6/1993  | Wood   | A47B 96/06  |
|           |   |   |         |        | 248/339     |
| 5,662,399 | A |   | 9/1997  | Henkel et al. |      |
| 5,718,493 | A | * | 2/1998  | Nikolai | A47B 88/941 |
|           |   |   |         |        | 403/68      |
| 5,964,438 | A | * | 10/1999 | Camilleri | A47B 95/008 |
|           |   |   |         |        | 248/323     |
| 6,007,171 | A |   | 12/1999 | Varellas-Olree |    |
| 6,076,308 | A | * | 6/2000  | Lyon   | E04B 2/7433 |
|           |   |   |         |        | 52/36.6     |

(Continued)

FOREIGN PATENT DOCUMENTS

EP    3183995 A1    6/2017

*Primary Examiner* — Daniel J Troy
*Assistant Examiner* — Timothy M Ayres
(74) *Attorney, Agent, or Firm* — Lawrence Chan; Oyen Wiggs Green & Mutala LLP

(57) ABSTRACT

A cabinets is provided. The cabinet includes a main panel defining a longitudinal axis and having a top edge. The cabinet also includes a plurality of vertical panels positioned in a laterally spaced relationship along the longitudinal axis of the main panel and in parallel planes each of the vertical panels being orthogonal to the main panel. The main panel and the vertical panels are coupled by hangers. The hangers each include an elongated body and a first end bracket at a first end of the elongated body. The first end bracket has a first hook that receives the top edge of the main panel. The vertical panels are also secured to either one of a top panel or a bottom panel so that either the top panel or the bottom panel holds the vertical panels against lateral movement relative to the main panel.

10 Claims, 28 Drawing Sheets

(56) References Cited

U.S. PATENT DOCUMENTS

| | | | | |
|---|---|---|---|---|
| 6,588,971 B2* | 7/2003 | Welch | .................... | F16B 12/20 |
| | | | | 24/669 |
| 7,603,821 B2* | 10/2009 | Eberlein | ............... | E04B 2/7425 |
| | | | | 52/261 |
| 8,579,388 B2* | 11/2013 | Centazzo | ............... | A47B 67/04 |
| | | | | 312/265.2 |
| 8,641,315 B2* | 2/2014 | Liu | ........................ | A47B 95/00 |
| | | | | 403/353 |
| 10,021,973 B1* | 7/2018 | Will | .................... | A47B 47/042 |
| 10,138,917 B2* | 11/2018 | Koch | ........................ | F16B 5/01 |
| 10,702,061 B2* | 7/2020 | Stack | ...................... | F16B 12/20 |
| 11,204,050 B2* | 12/2021 | Kennedy | .................. | A47C 7/54 |
| 11,378,116 B2* | 7/2022 | Bastian | .................. | F16B 21/09 |
| 2010/0079045 A1* | 4/2010 | Yeh | ........................ | A47B 47/04 |
| | | | | 312/263 |
| 2020/0359787 A1 | 11/2020 | Chang | | |

* cited by examiner

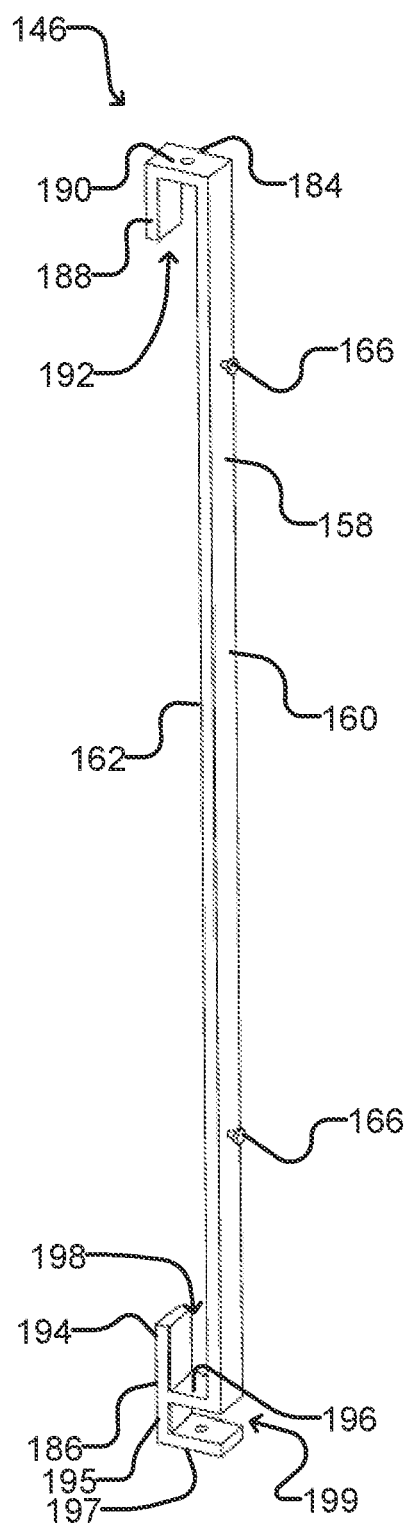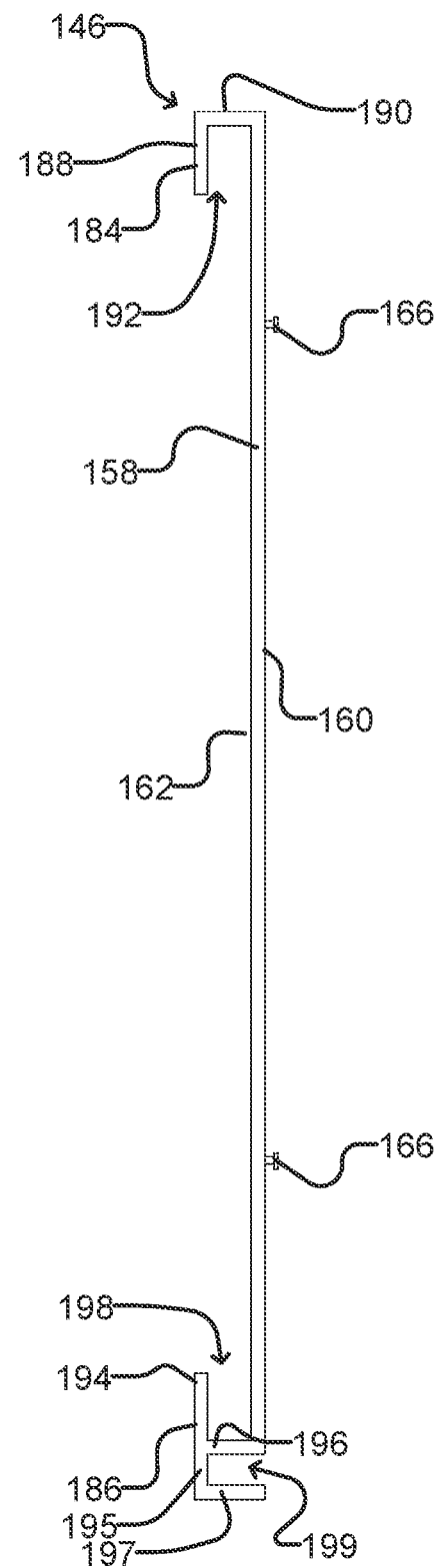
FIG. 6A
FIG. 6B

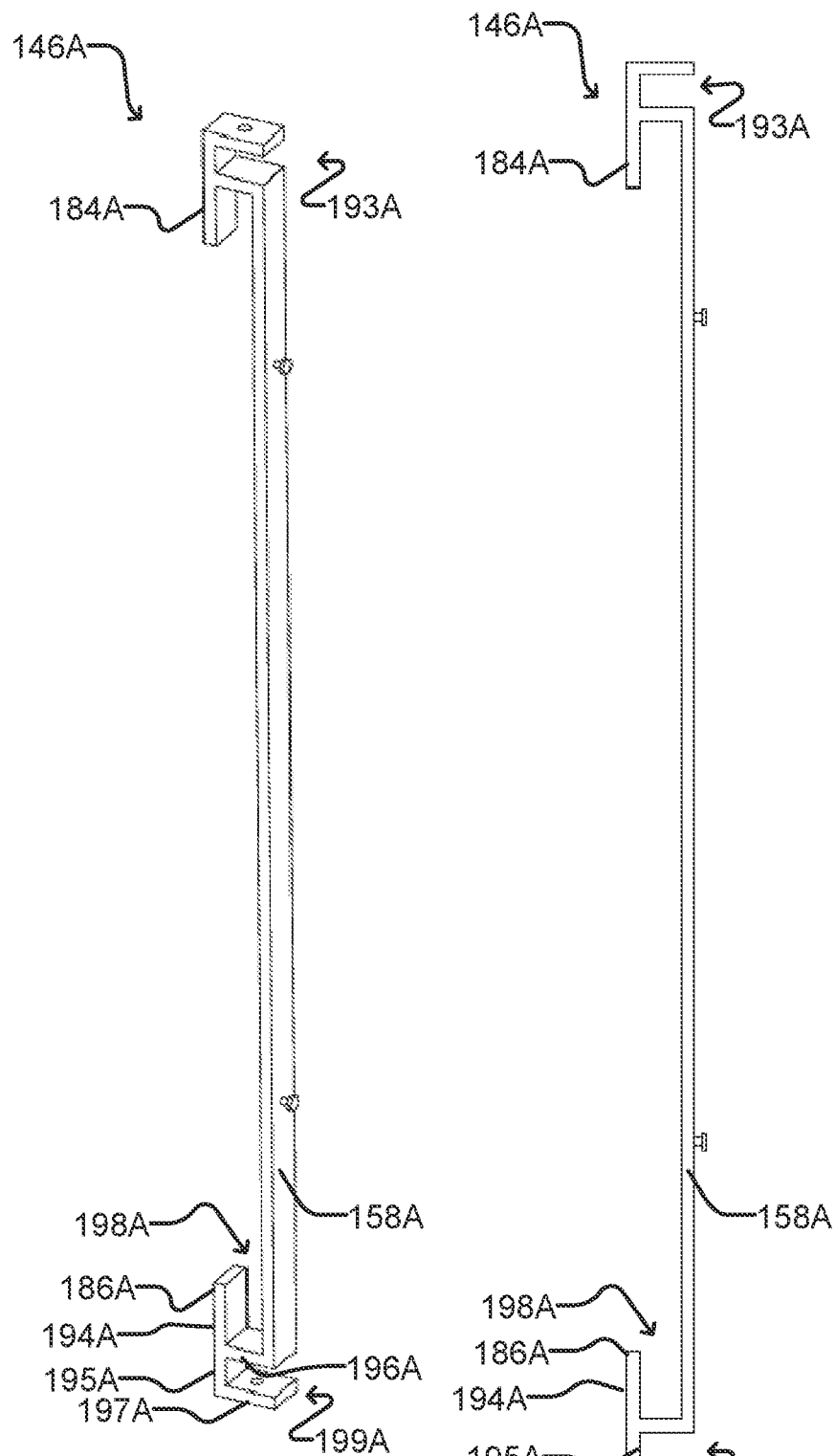

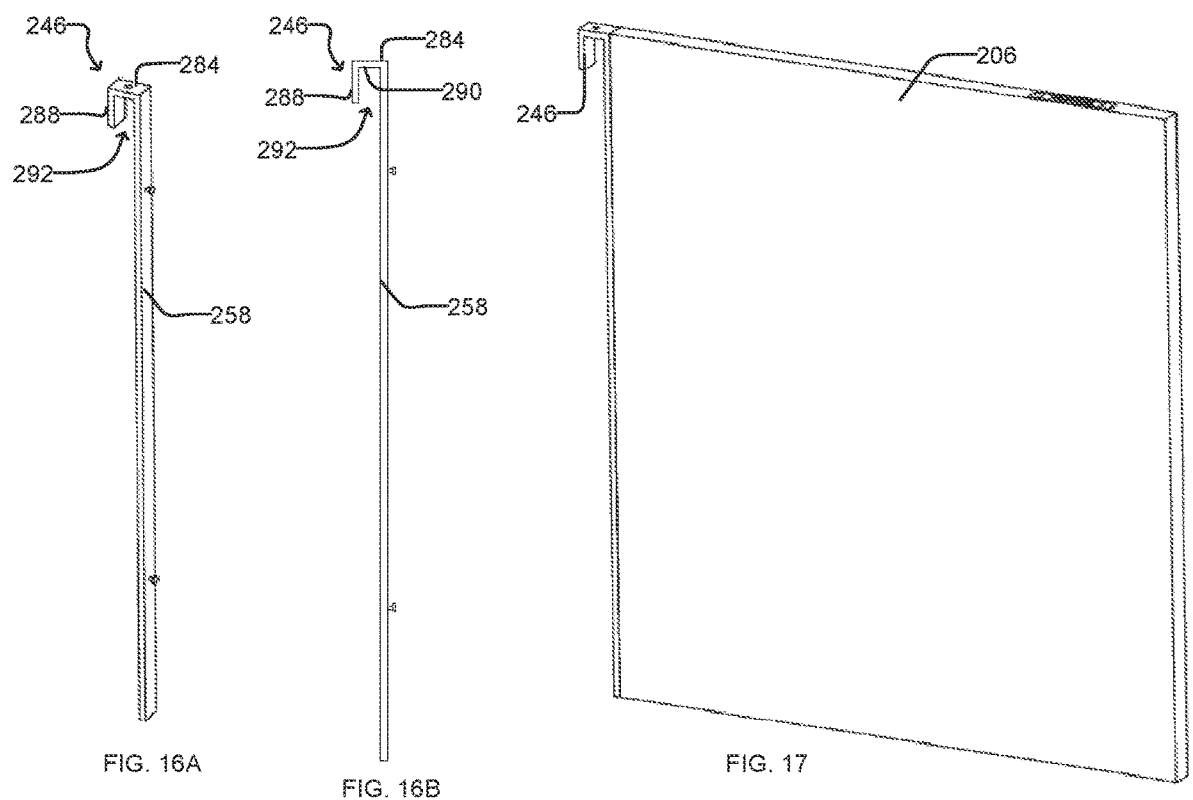

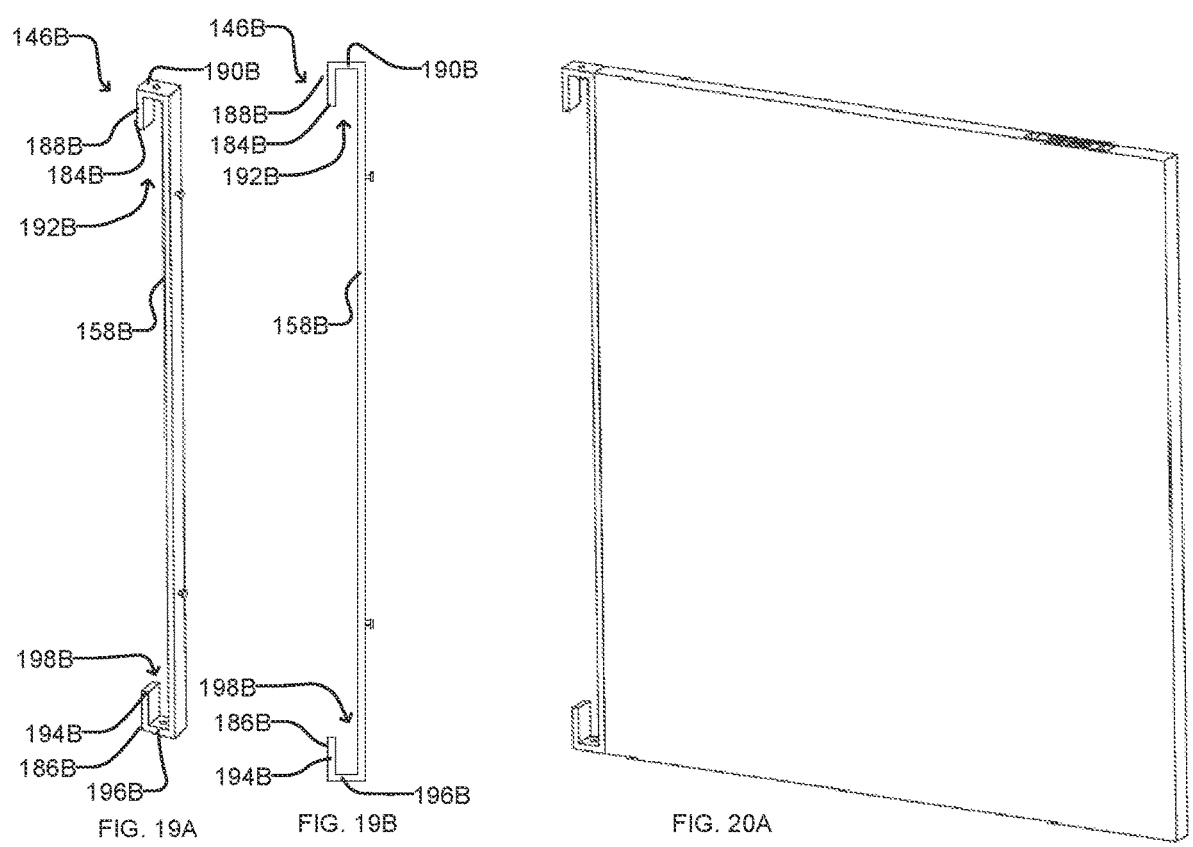

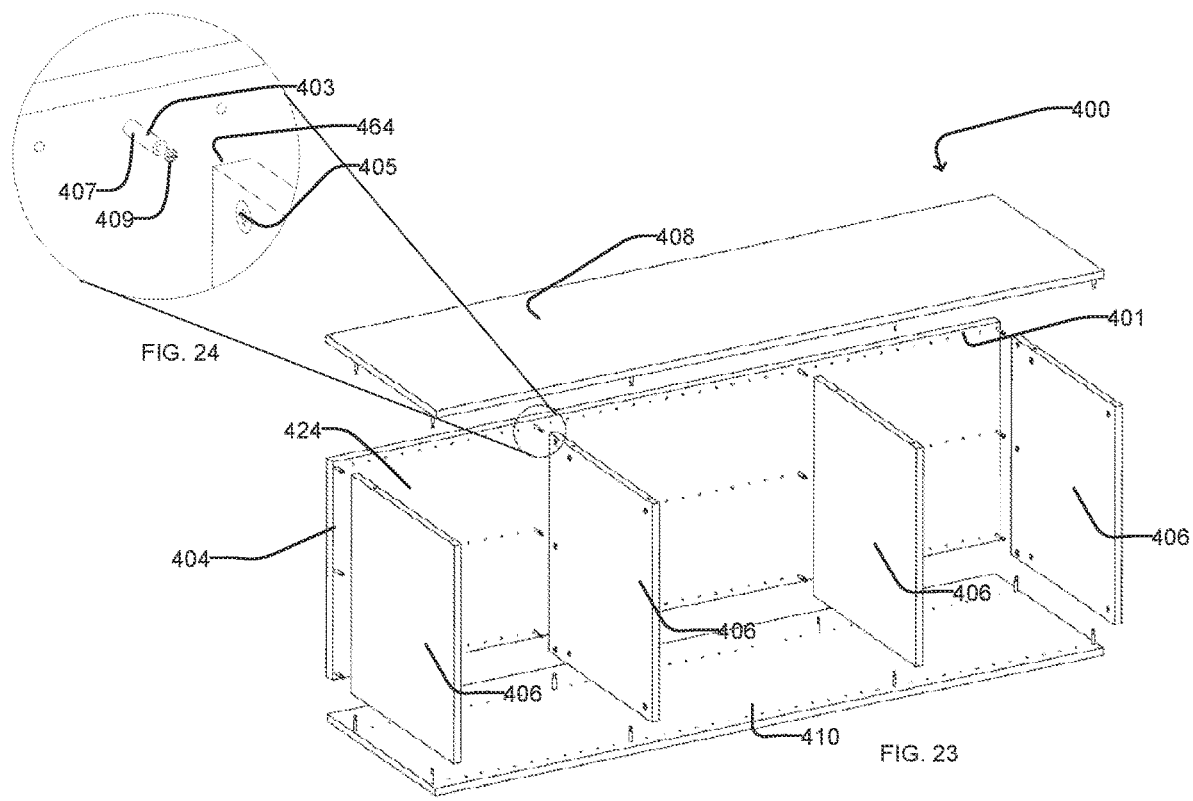

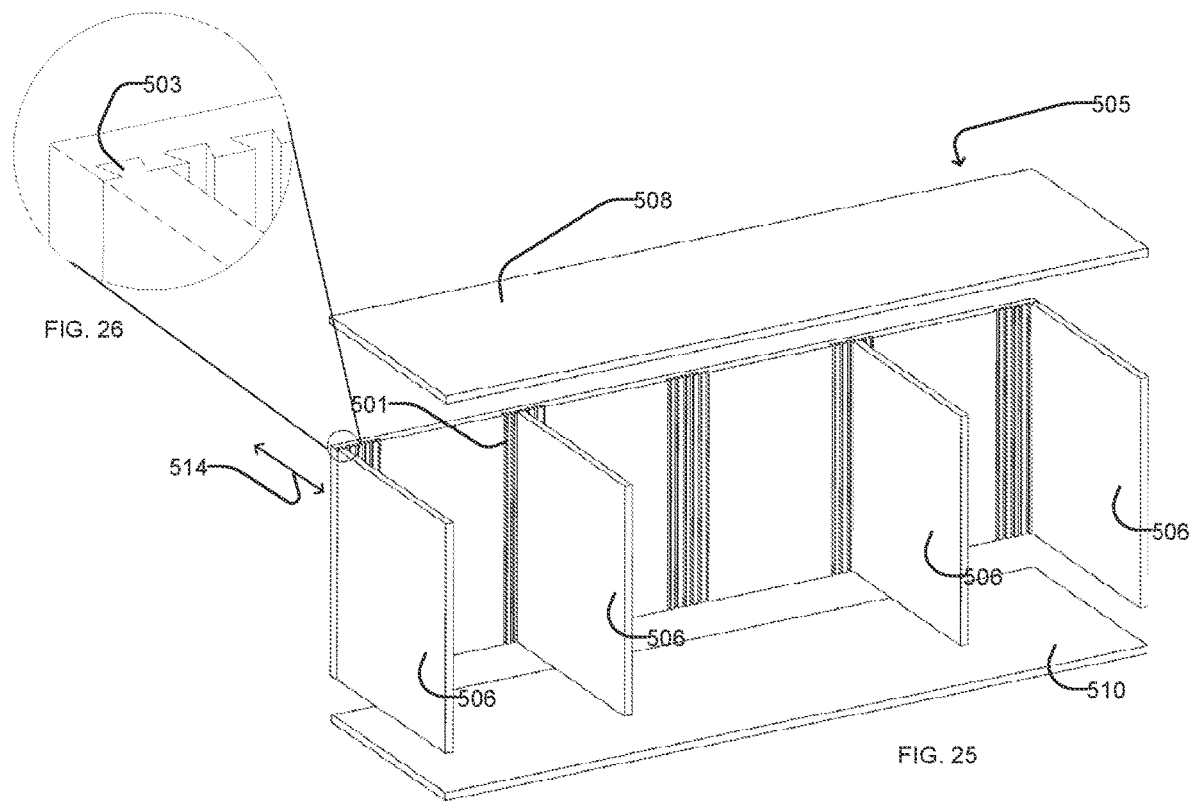

CABINETS, CABINET ASSEMBLY SYSTEMS AND METHODS OF CABINET CONSTRUCTION

This application claims priority of Canadian Patent Application No. 3,108,473 filed on Feb. 8, 2021. This present invention relates generally to cabinets, cabinet assembly systems and methods of cabinet construction. Some embodiments relate to cabinets, including kitchen cabinets, storage cabinets, and wardrobes. Some embodiments relate to cabinet assembly systems, including ready-to-assemble systems. Some embodiments relate to methods of cabinet construction, including the assembling of cabinets from wooden parts or pieces.

TECHNICAL FIELD

This present invention relates generally to cabinets, cabinet assembly systems and methods of cabinet construction. Some embodiments relate to cabinets, including kitchen cabinets, storage cabinets, and wardrobes. Some embodiments relate to cabinet assembly systems, including ready-to-assemble systems. Some embodiments relate to methods of cabinet construction, including the assembling of cabinets from wooden parts or pieces.

BACKGROUND

Prior art cabinets may be divided into two groups: custom-built cabinets and pre-built cabinets. Custom-built cabinets and pre-built cabinets are alternatives and some of their characteristics are summarized in Table 1 below and will be further discussed.

TABLE 1

Comparison between Custom-Built Cabinets and Pre-Built Cabinets

|  | Features | Advantages | Disadvantages |
| --- | --- | --- | --- |
| Custom-Built Cabinets | Custom-built cabinets are designed and made to meet individual customers' space requirements, taste, and/or desires. | High level of customization High-quality craftsmanship | Expensive and time-consuming to manufacture |
| Pre-Built Cabinets | Pre-built cabinets are pre-manufactured in quantity and are designed to provide features selected by the manufacturer and to meet typical room dimensions. | Cheaper than custom-built cabinets Relatively easy to install | May not be of high-quality craftsmanship Limited customization options |

Custom-built cabinets are those that are specifically designed and made in style and/or size so that individual customers' space requirements, taste, and/or desires can be met. Custom-built cabinets may be of high quality, good craftsmanship, and strong durability. However, custom-built cabinets are often more expensive and time consuming to manufacture than pre-built cabinets.

Pre-built cabinets are a series of cabinets or (cabinet) units that are pre-manufactured in quantity and are adapted to be joined together in various fashions. Pre-built cabinets permit the manufacturer to achieve economies of scale to thereby reduce some manufacturing costs. However, pre-built cabinets do not provide a great deal of customization options. Instead, they are often designed to provide features selected by the manufacturer and to meet typical room dimensions.

In view of the different characteristics and trade-offs of custom-built cabinets and pre-built cabinets, there is a desire for "hybrid" cabinets that permit the integration of a high level customization afforded by custom-built cabinets and cost savings typically associated with pre-built cabinets.

On a related point, the pre-built process has generally been approached by the manufacturers as a package deal in such a way that the manufacturers may arbitrarily set the dimensions of certain usable parts to be different from those of their competitors. For example, a manufacturer may set the dimensions of its cabinet doors to be of different dimensions than those of its competitors. In this way, the consumer is forced to purchase every piece, ranging from the less expensive cabinet body to the more expensive doors, from the same manufacturer. There may be a desire for a cabinet assembly system (and/or cabinets) that is versatile and permits the consumer to change the dimensions of the cabinet body with relative ease.

Further, there is a desire for a cabinet assembly system that permits installation with limited manpower, e.g. one single individual. A current common installation practice is to secure cabinet units directly to supporting surfaces including walls, ceilings, and/or floors. This is often difficult to accomplish, particularly when only one individual is available for the installation process. Cabinets can be heavy to maneuver and during installation, re-positioning may be required several times before a satisfactory arrangement is achieved. As such, the prior-art installation techniques can be time consuming, labour intensive, and not satisfactory. An improved cabinet assembly system and a method of cabinet construction are desirable to permit a relatively simple installation process, even when limited manpower of only a single individual is available.

Further still, there is also a desire for a cabinet assembly system that permits more efficient use of raw materials, which may lead to manufacturing cost savings and environmental benefits.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention has a number of aspects. These include without limitation:
  a cabinet (e.g. cabinets for use in a kitchen, bathroom, utility room, storage room, closet, and recreation room);
  a kit of parts for making a cabinet;
  hangers (e.g. for holding parts of cabinets in desired relationships); and
  methods for assembling or constructing a cabinet.

A first aspect of the present invention is directed to new and useful cabinets, which may be understood as a "hybrid" of custom-built and pre-built cabinets. Some advantages that may be provided by some embodiments of the cabinets include that they may permit the integration of a high level of customization as is typically available with custom-built cabinets and cost savings typically associated with pre-built cabinets; they may be installed with limited manpower, e.g.

a single individual; and they may permit more efficient use of raw materials than prior-art cabinets. The cabinets may, for example, be upper cabinets, lower cabinets, island cabinets, storage cabinets, wardrobes, or the like.

Structurally, the cabinets include a frame structure, which may be understood as a cabinet body without doors. The frame structure includes a plurality of panel components (or "panels") and an assortment of hardware pieces for holding the panel components together. "Panel components" (or "panels") are generally flat, rigid sheets of any suitable materials, including wood, wood veneers, foam core panels, etc. The plurality of panel components include a main panel, a plurality of vertical panels, a top panel, and a bottom panel. The main panel functions as a wallboard for hanging the vertical panels thereon. The main panel defines a longitudinal axis. The vertical panels function as partitioning or end members to define separate cabinet compartments. The vertical panels are positioned in laterally spaced relationship along the longitudinal axis of the main panel and in parallel planes each being orthogonal to the main panel. The vertical panels are slidably coupled to the main panel by hangers, which allow the location of a vertical panel relative to the main panel to be adjusted laterally along the longitudinal axis of the main panel, during assembly of the cabinet. The same panel components may be used to make cabinets with any reasonable number of vertical panels and any reasonable spacing between the vertical panels. The top panel is secured to top edges of the vertical panels. The bottom panel is secured to bottom edges of the vertical panels. The attachment of the vertical panels to the top panel and the bottom panel holds the vertical panels so that a desired spacing is maintained between adjacent ones of the vertical panels.

The hangers are configured and adapted to engage, optionally slideably engage, the top edge of the main panel. The hangers may each include an elongated body that, in use, extends in a direction that is parallel to a vertical direction and is orthogonal to the longitudinal axis of the main body. The hangers may each include a first end bracket at a first end of the elongated body. The first end bracket may include a first hook for receiving the top edge of the main panel and thereby hanging from the main panel. The first end bracket may include a first receiver for receiving and supporting the top panel. The first receiver may define an opening direction that is orthogonal to that of the first hook.

In some embodiments, the first hook includes a first arm spaced away from the elongated body and an intermediate portion connecting the first arm with the elongated body. The first arm may be parallel to the elongated body. The first arm, the elongated body, and the intermediate portion may be in the same plane as one another. The first hook may be U-shaped, whereby the first arm and the elongated body define the arms and the intermediate portion defines the base of the U-shaped channel.

In some embodiments, the first receiver includes a second arm spaced apart from the intermediate portion and projecting in a direction that is substantially parallel to the intermediate portion. The first receive also includes a third arm connecting the intermediate portion and the second arm. The first receiver may be U-shaped, whereby the intermediate portion and the second arm define the arms and the third arm defines the base of the U-shaped channel.

In some embodiments, the hangers each have a second end bracket positioned opposite to the first end bracket. The second end bracket may include a second hook for receiving the bottom edge of the main panel. The second end bracket may include a second receiver for receiving and supporting the bottom panel. The second receiver may define an opening direction that is orthogonal to that of the second hook. The second end bracket may be a mirror image of the first end bracket.

The elongated body may have a vertical length that corresponds substantially to the vertical height of the main panel so that the elongated body runs from about the top edge of the main panel to about the bottom edge of the main panel. The elongated body may have a width that is substantially equal to a thickness of the vertical panel to which it is attached.

Some hardware pieces may be part of or secured onto the elongated body. The hardware pieces may be configured to and adapted to engage other hardware pieces mounted on a vertical panel so that the vertical panel can be coupled, optionally detachably coupled, to the hanger. Some example hardware pieces include anchor screws or pins, which are configured to engage corresponding keyhole hangers.

In some embodiments, to guide the lateral movement of the hangers (and thereby the vertical panels coupled thereto) relative to the main panel, and to support the hangers when the hangers have been positioned at desired locations, the main panel may include a longitudinally-extending track constructed on its top edge or a bottom edge. The longitudinally-extending track(s) may have any suitable configurations, some of which may be a rabbet configuration and some of which may be a groove configuration.

For example, the track may include a rail portion projecting from a generally flat portion. The rail portion and the generally flat portion provide a recess outwardly from the rail portion. The rail portion is configured and adapted to be received by the U-shaped channel of the first end bracket of the hanger. When the hanger slides laterally along the main panel, the arm of the U-shaped channel moves within the recess and without being in direct contact with a supporting wall to which the main panel may be secured to so that the lateral movement of the hanger does not cause damage to the supporting wall.

In some other embodiments, the track may include a rail portion and an outwardly spaced flange. Together, the rail portion and the flange providing a groove spaced outwardly from the rail portion. The rail portion is configured and adapted to be received by the U-shaped channel of the first end bracket of the hanger. When the hanger slides laterally along the main panel, the arm of the U-shaped channel moves within the groove and without being in direct contact with a supporting wall to which the main panel may be secured to so that the lateral movement of the hanger does not cause damage to the supporting wall.

Another aspect of the present invention is directed to a cabinet assembly system, such as a ready-to-assemble cabinet system, that includes a plurality of panel components and an assortment of hardware pieces. The cabinet system may also include an assembly instruction manual.

Another aspect of the present invention is directed to a method of cabinet construction. The method includes a step of securing a main panel to a supporting surface so that an orientation of the main panel can be maintained. The supporting surface may be a wall or a base frame structure. The orientation may be orthogonal to a floor. Hangers are coupled to the main panel and vertical panels are coupled to the hangers. The vertical panels may be coupled to the hangers before the hangers have been coupled to the main panel. Alternatively, the vertical panels may be coupled to the hangers after the hangers have been coupled to the main panel. Either a top panel is coupled to top edges of the vertical panels or a bottom panel is coupled to bottom edges of the vertical panels. The main panel, the vertical panels, and either one of the top panel or the bottom panel are coupled together to provide a frame structure for a cabinet. The hangers support the vertical panels to be at least generally orthogonally to the main panel. The top panel and the bottom panel may both be present, wherein the top panel is coupled to the top edges of the vertical panels and the bottom panel is coupled to the bottom edges of the vertical panels. In such embodiments, the main panel, the vertical panels, the top panel, and the bottom panel are coupled to provide the frame structure for the cabinet. The hangers each may comprise hooks on opposed ends and the hooks are hooked over the top edges and the bottom edges of the vertical panels so that the hangers are slidably coupled to the main panel. In such embodiments, the hangers may be slid laterally to desired locations along the main panel. The hangers may be fastened to the main panel so that the hangers are fixed relative to the main panel.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 6A is a perspective view of the hanger of the upper cabinets of FIG. 1.

FIG. 6B is a side elevation view of the hanger of the upper cabinets of FIG. 1.

FIG. 12A is a perspective view of a hanger according to an alternative embodiment.

FIG. 12B is a side elevation view of the hanger of FIG. 12A.

FIG. 16A is a perspective view of the hanger of the lower cabinets of FIG. 14.

FIG. 16B is a side elevation view of the hanger of the lower cabinets of FIG. 14.

FIG. 17 is a perspective view of a vertical panel coupled to the hanger of FIGS. 16A and 16B.

FIG. 19A is a perspective view of a hanger according to an alternative embodiment.

FIG. 19B is a side elevation view of the hanger of FIG. 19A.

FIG. 20A is a perspective view of a vertical panel coupled to the hanger of FIG. 19A.

FIG. 23 is an exploded, perspective view of cabinets (without doors) formed from a cabinet assembly system according to another embodiment of the present invention.

FIG. 24 is an enlarged, partial view of the cabinets of FIG. 23.

FIG. 25 is an exploded, perspective view of cabinets (without doors) formed from a cabinet assembly system according to another embodiment of the present invention.

FIG. 26 is an enlarged, partial view of the cabinets of FIG. 25.

DESCRIPTION

Figure 1:
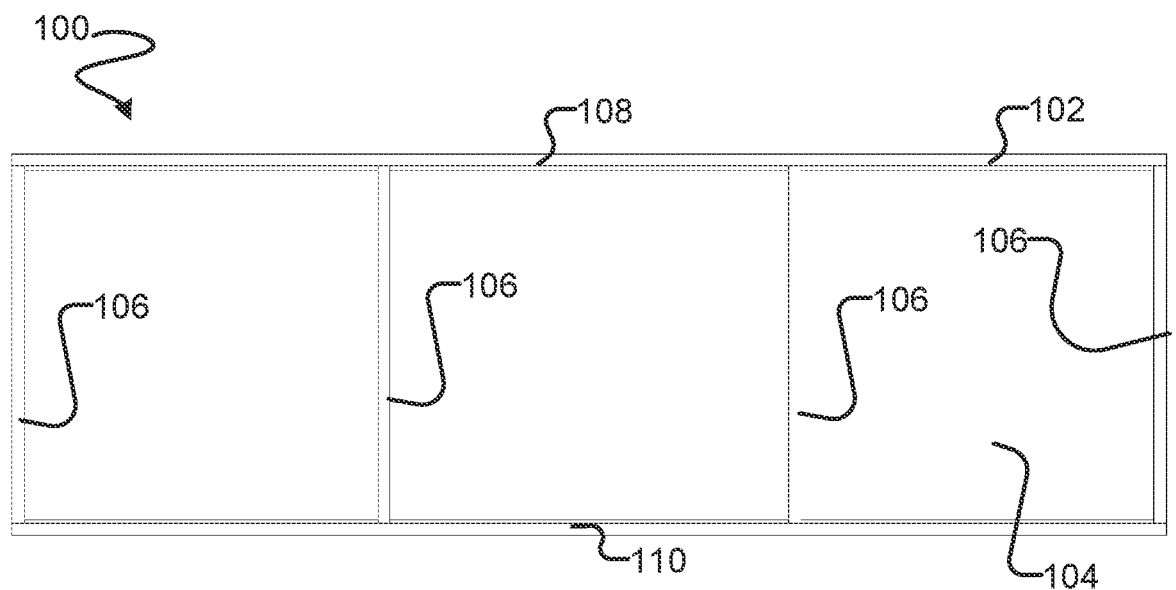
FIG. 1 is a front elevation view of upper cabinets (without doors) formed from a cabinet assembly system according to a first embodiment of the present invention.

Several embodiments will be now described to set forth specific details in order to provide a more thorough understanding of the present invention to persons skilled in the art. The description may use perspective-based descriptions such as top/bottom, up/down, front/rear, and vertical/lateral/transverse to facilitate the discussion and these descriptions are not intended to restrict the application of the disclosed embodiments. The following description sets forth specific details in order to provide a more thorough understanding to persons skilled in the art. Well-known elements may not have been shown or described in detail to avoid unnecessarily obscuring the disclosure. The description and drawings are to be regarded in an illustrative, rather than a restrictive, sense. Reference will now be made to the drawings wherein like reference numerals identify similar structural features or aspects of the present invention.

Figure 2:
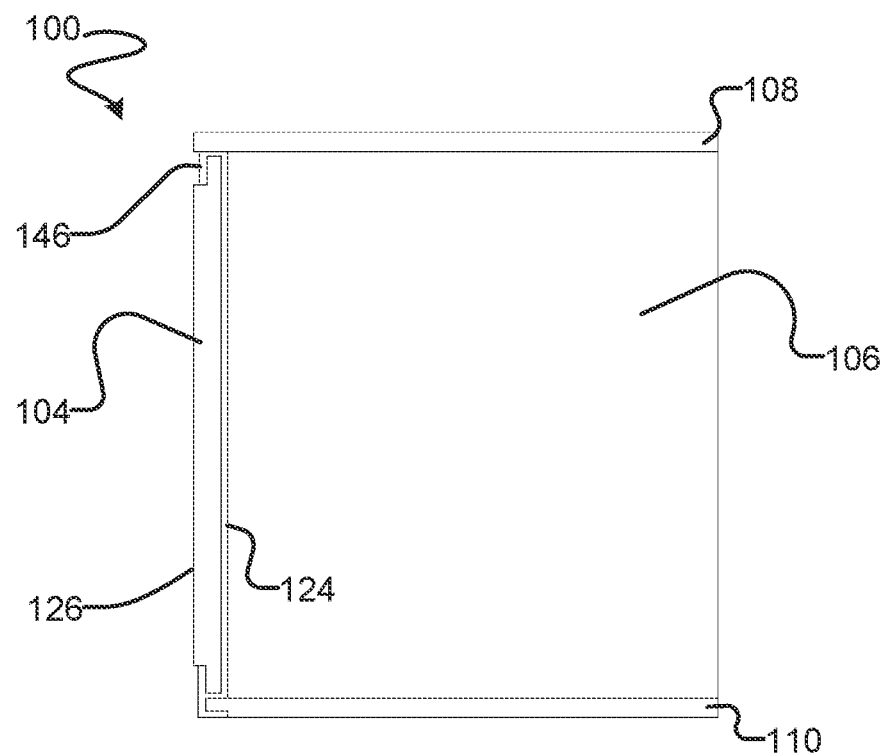
FIG. 2 is a side elevation view of the upper cabinets of FIG. 1.
Figure 3:
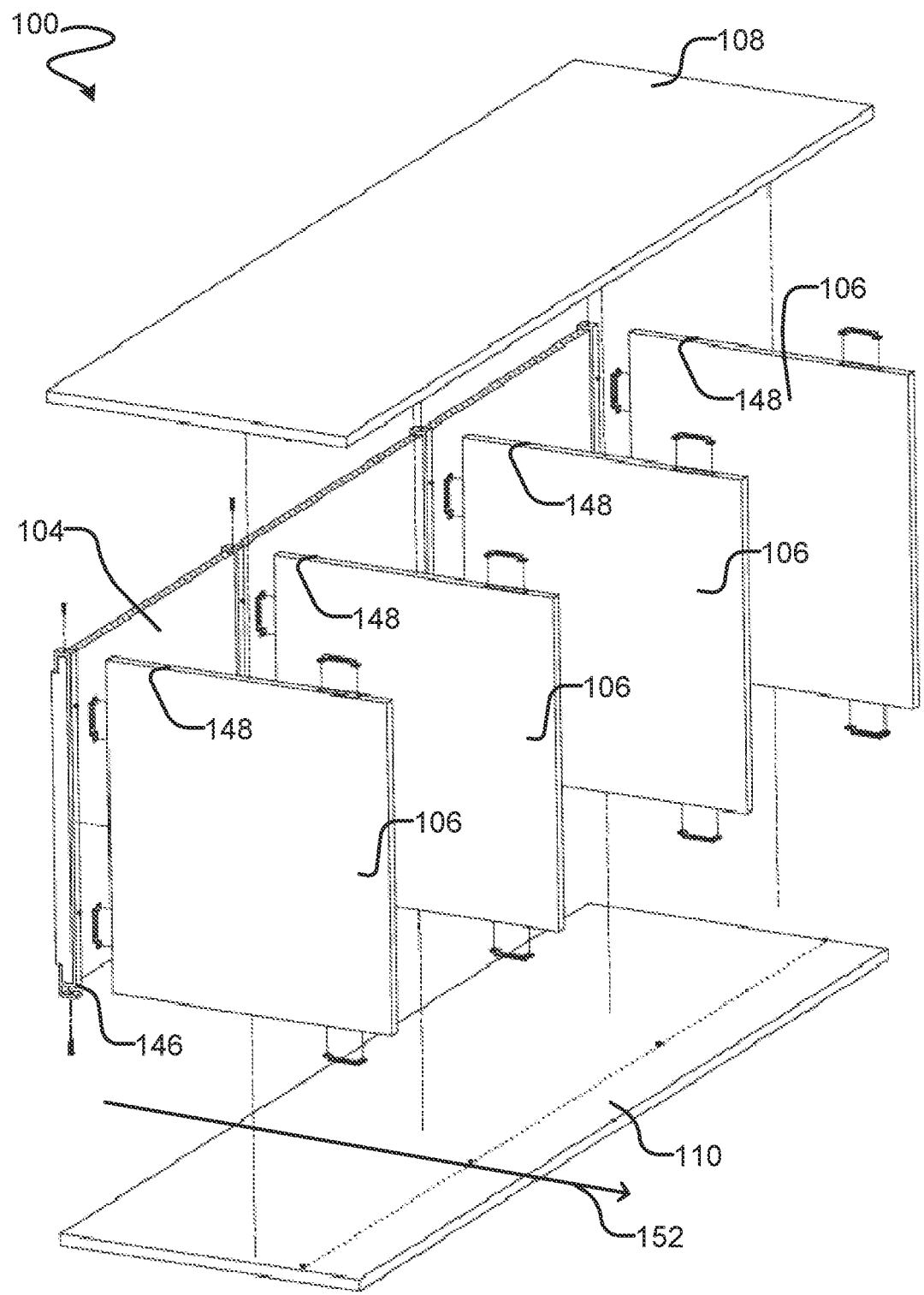
FIG. 3 is an exploded perspective view of the upper cabinets of FIG. 1.

An upper cabinet having multiple cabinet units and without doors 100 (elsewhere referred to as upper cabinets 100) according to a first embodiment of the present invention are shown in FIGS. 1-3. Additionally, FIGS. 4-5, 6A-6B, 7A-7B, 8A-8B, 9A-9C, 10A-10B, and 11A-11D show certain individual components of upper cabinets 100 and illustrate how such components are assembled together to provide upper cabinets 100. A person skilled in the art would understand that the structural features of upper cabinets 100 may be incorporated in other kitchen cabinets (including lower cabinets and island cabinets), storage cabinets, wardrobes, or the like.

The design of upper cabinets 100 may be applied to provide cabinets that are a "hybrid" of custom-built and pre-built cabinets. Some of the advantages that such hybrids may provide include that they may permit the integration of a high level of customization (akin to that of custom-built cabinets) and cost savings (as may be associated with pre-built cabinets).

Other advantages that may be possessed by some embodiments include: cabinets like upper cabinets 100 may be installed with limited manpower, e.g. a single individual; and such cabinets may permit more efficient use of raw materials than some prior-art cabinets.

Upper cabinets 100 include a frame structure 102, which may be understood as a cabinet body without doors. Frame structure 102 is formed by a plurality of panel components. As the name suggests, "panel components" (or "panels") are generally flat, rigid sheets of material. Panels may be made of almost any sturdy material, such as wood, laminated wood, foam core boards, particle board, etc. For example, the panel components may be made of particle board or hollow core panel that is covered by veneer for an attractive appearance and/or for protection. An example of a sturdy material that may be used for constructing panel components is plywood, ¾ inch to 1 inch thick.

The plurality of panel components include a main panel 104, a plurality of vertical panels 106, a top panel 108, and a bottom panel 110, which will be described in detail below.

Main panel 104 functions as a wallboard for hanging vertical panels 106 thereon. This arrangement may be advantageous because main panel 104 may be made as a single piece. Vertical panels 106 can be easily aligned when they are properly hung on main panel 104. In some alternative embodiments, main panel 104 includes two or more separate panels attached to a supporting wall, wherein the separate panels are aligned with each other and positioned side by side. The aligned separate panels function in a similar fashion as a single piece main panel 104 to allow vertical panels 106 to be easily aligned.

Advantageously, the design of frame structure 102 allows main panel 104 to be attached to a supporting wall (or studs of a wall) before vertical panels or other parts of frame structure 102 have been attached to main panel 104. Main panel 104 may be much lighter in weight and much easier to handle than a fully assembled set of conventional upper cabinets, This may permit installation with limited manpower, e.g. one individual. Instead of lifting, positioning, and securing a cabinet onto a supporting wall, it would be less labour intensive to lift, position, and secure a single panel, i.e. main panel 104, onto a supporting wall.

In the context of the overall geometry of frame structure 102, main panel 104 provides a rear panel. Main panel 104 has a front wall 124 and a rear wall 126.

Figure 5:
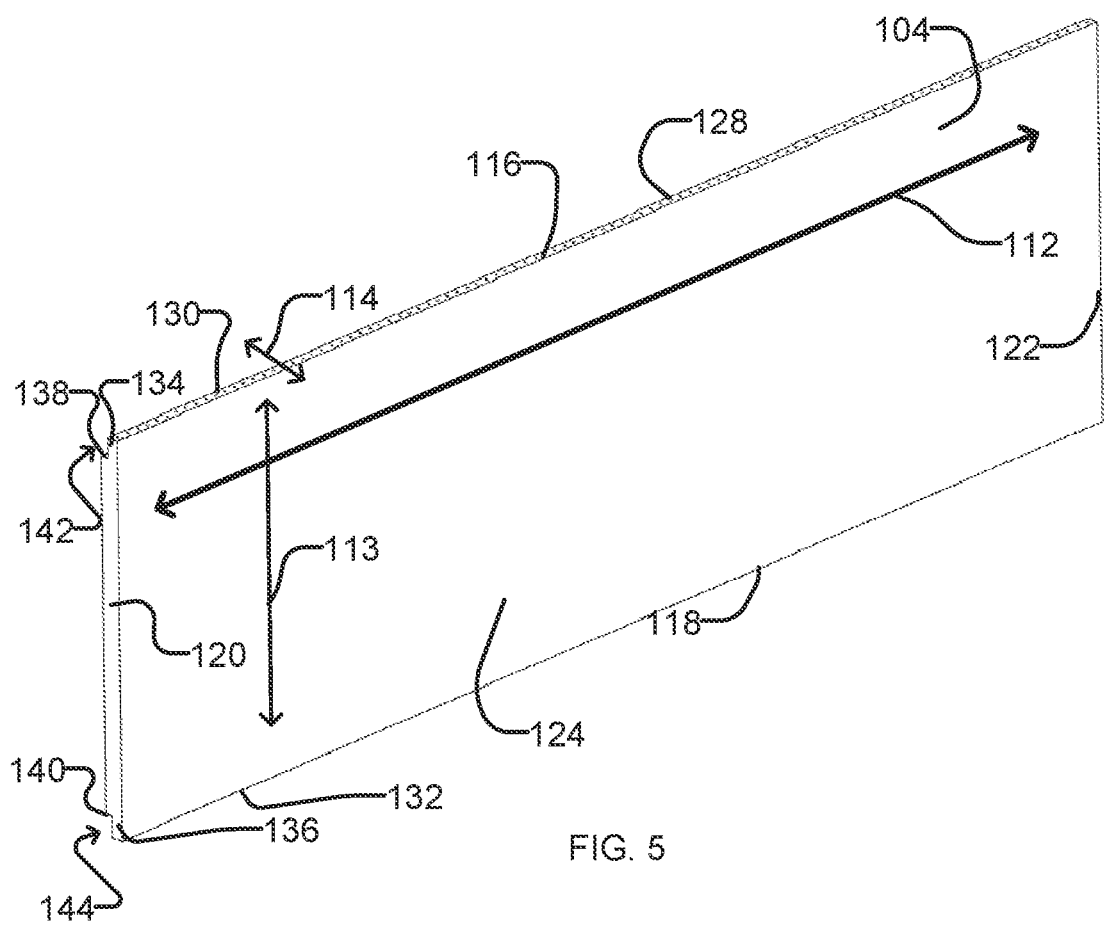
FIG. 5 is a perspective view of the main panel of the upper cabinets of FIG. 1.
Figure 7A:
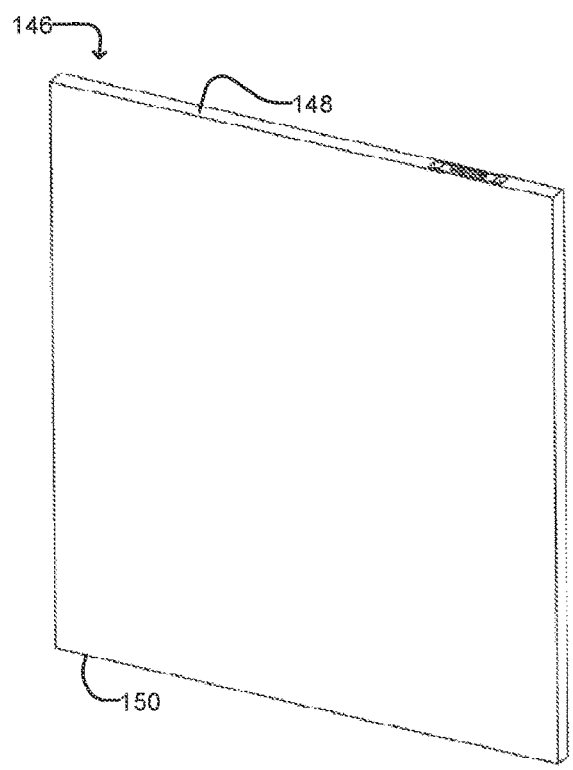
FIG. 7A is a perspective view of a vertical panel of the upper cabinets of FIG. 1.
Figure 7B:
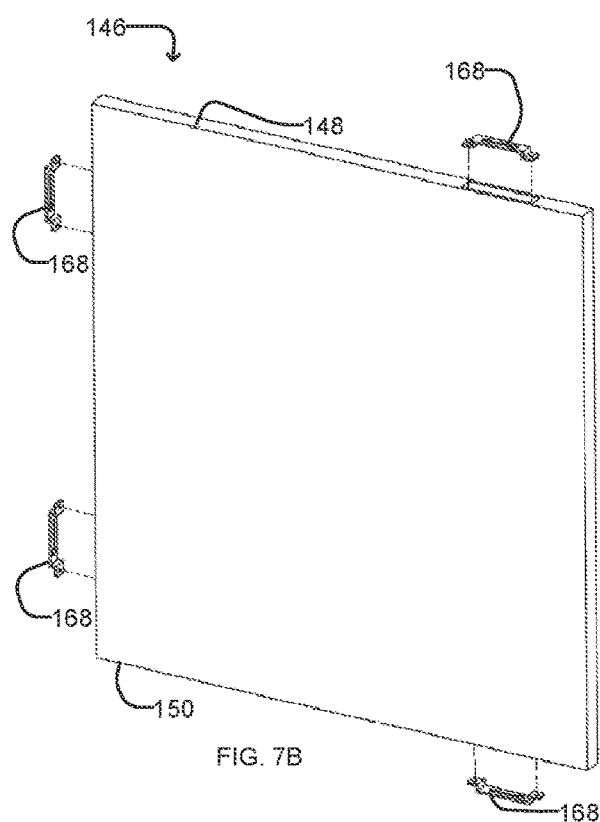
FIG. 7B is an exploded view of a vertical panel of the upper cabinets of FIG. 1.
Figure 8A:
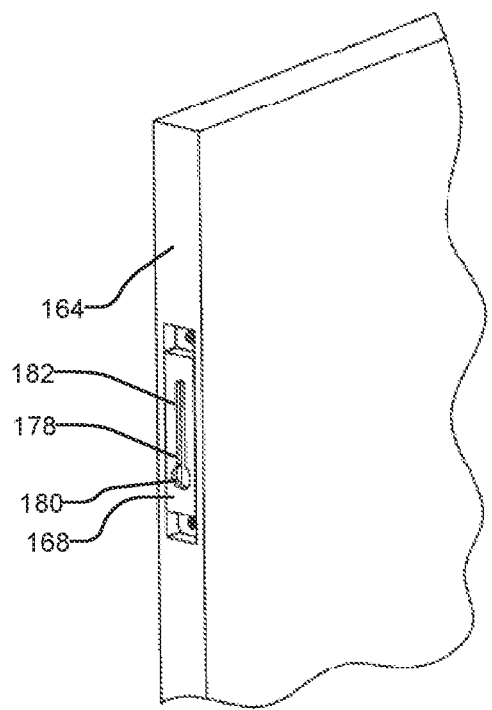
FIG. 8A is a partial, enlarged, perspective view of a vertical panel of the upper cabinets of FIG. 1.
Figure 8B:
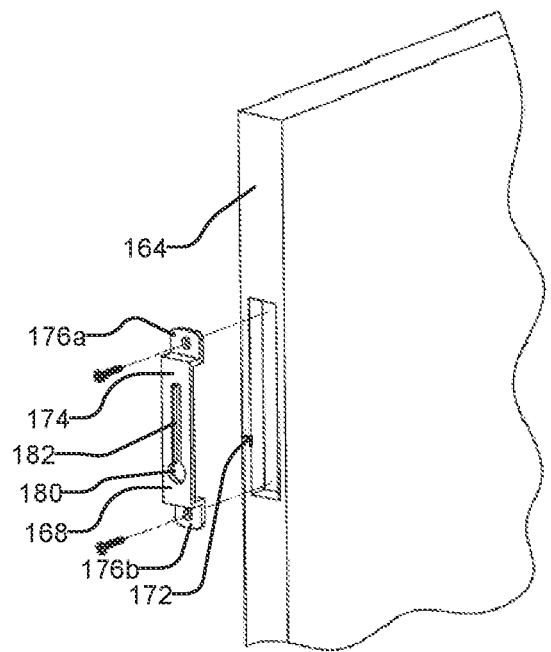
FIG. 8B is an enlarged, partial, exploded view of a vertical panel of the upper cabinets of FIG. 1.
Figure 9A:
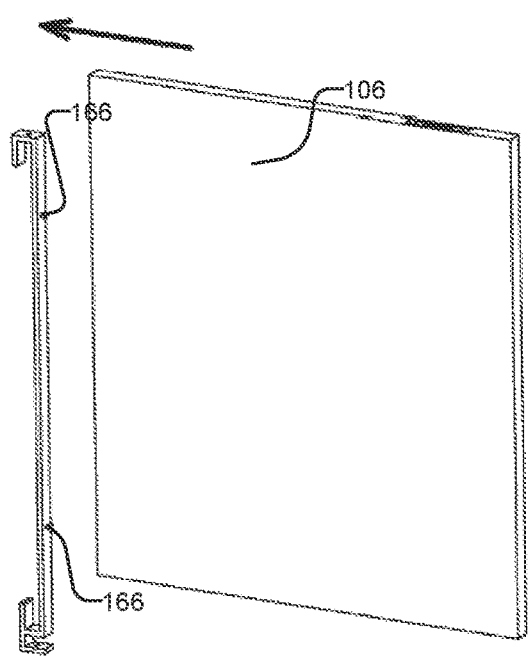
FIGS. 9A-9C and FIGS. 10A-10B illustrate the process to couple a vertical panel to a hanger of the upper cabinets of FIG. 1.
Figure 9B:
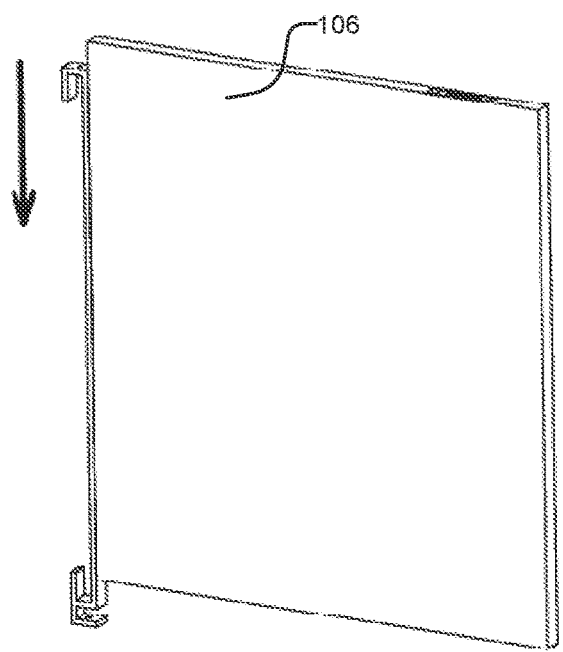
Figure 9C:
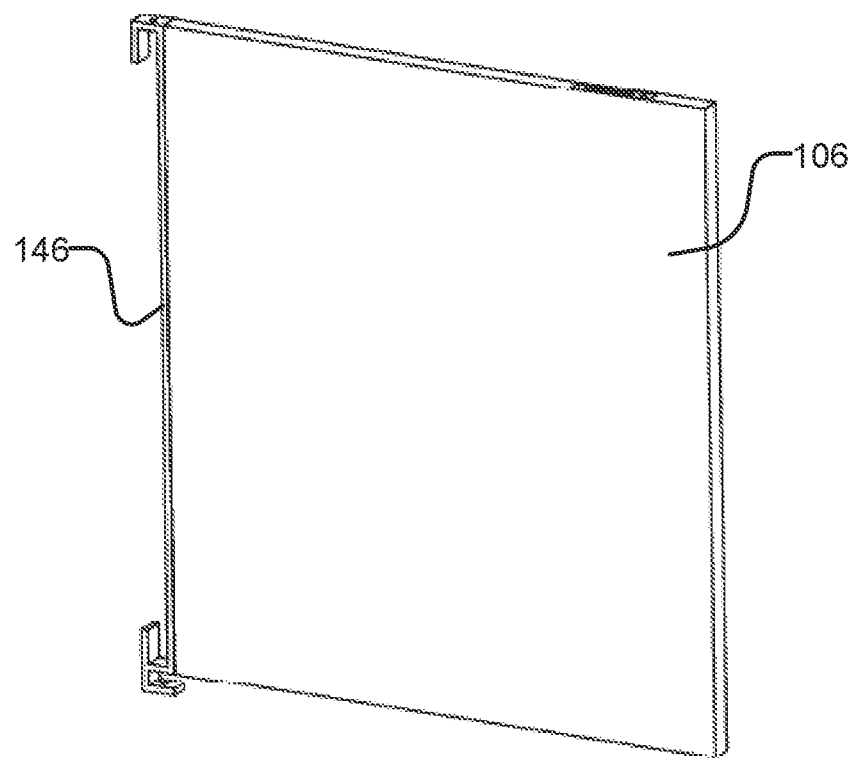
Figure 10A:
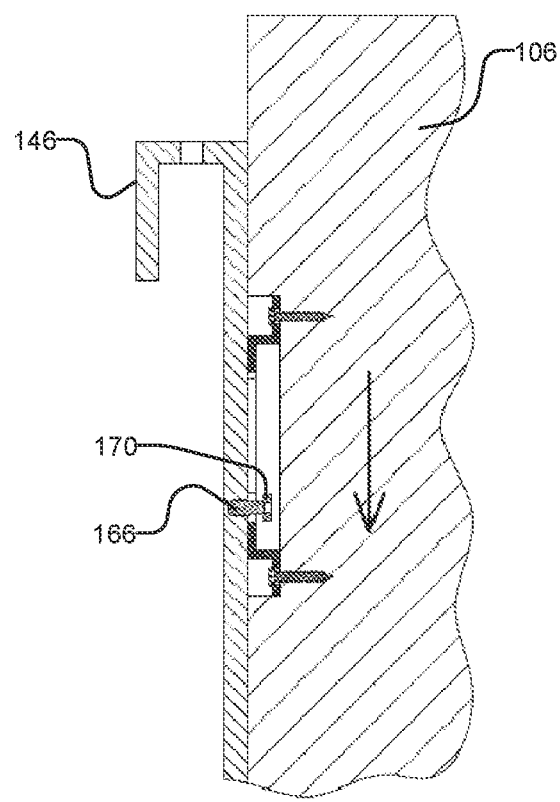
Figure 10B:
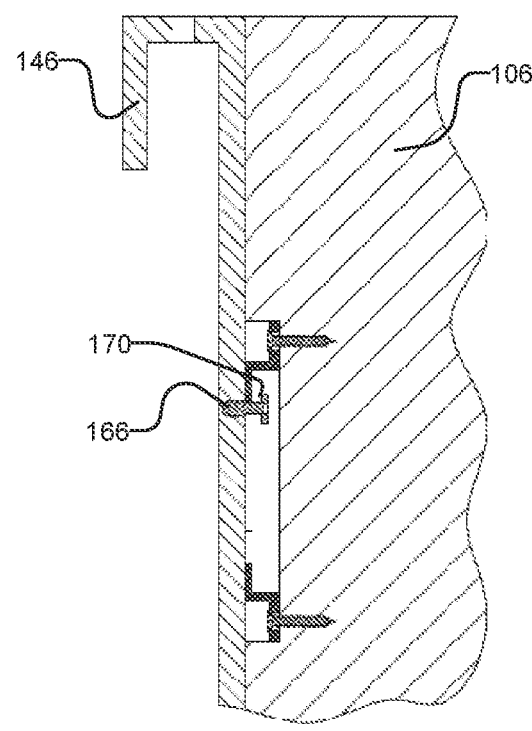

Better shown in FIG. 5, main panel 104 defines a longitudinal axis 112, a vertical axis 113, and a transverse axis 114 which extends in an inboard-outboard direction from front wall 124 to rear wall 126 (normal to front wall 124 and rear wall 126). Longitudinal axis 112, vertical axis 113, and transverse axis 114 are orthogonal to one another.

Main panel 104 is generally rectangular in shape and has a top edge 116, a bottom edge 118, and two outmost side edges 120, 122. Along longitudinal axis 112, main panel 104 has a lateral length "L" starting from first (left) outmost side edge 120 and terminating at second (right) outmost side edge 122. Along vertical axis 113, main panel 104 has a vertical height "h" starting from top edge 116 and terminating at bottom edge 118. Along transverse axis 114, main panel 104 has a thickness "t" starting from front wall 124 to rear wall 126. In some embodiments, main panel 104 may be supplied with dimensions as follows:

lateral length "L": 96 inches (a main panel 104 may be cut to a shorter length as needed or used together with other main panel sections if a longer length is needed);
vertical height "h": 30 inches, 35 inches or 40 inches; and
thickness "t": ¾ inch or 1 inch.

Main panel 104 may have any other suitable shape and dimensions perhaps to accommodate a customer's space requirements. For example, main panel 104 may be non-rectangular in shape perhaps to accommodate the presence of appliances such as hood fans, wall ovens, refrigerators, and the like. Main panel 104 may be custom made to occupy an upper portion of a wall from one end to an opposite end.

Main panel 104 may have a plurality of holes 128 formed on top edge 116 and/or bottom edge 118. As it will be further discussed in relation to hangers 146, holes 128 may be placed to guide precise positioning and/or re-positioning of hangers 146. Holes 128 may be used to fasten hangers 146 at desired positions.

Holes 128 may be spaced apart laterally in an even manner. The lateral centre-to-centre distance "d" between one hole 128 and an adjacent one of holes 128 may, for example, be in the range of ½ inch to 8 inches. The lateral centre-to-centre distance "d" between one hole 128 and an adjacent one of holes 128 may, for example, be an integer number of inch(es) or cm(s). The lateral centre-to-centre distance "d" between one hole 128 and an adjacent one of holes 128 may, for example, be an integer multiple of a thickness of vertical panels 106.

Holes 128 may facilitate placing vertical panels 106 at any multiple of the spacing of holes 128 anywhere along main panel 104. When holes 128 are formed on top edge 116 and bottom edge 118, holes 128 along top edge 116 may be vertically aligned with corresponding holes along bottom edge 118.

In some embodiments the spacing between adjacent holes 128 is substantially equal to the thickness of a vertical panel 106. For example, if a vertical panel 106 is ¾ inch thick, the lateral centre-to-centre distance "d" between one hole 128 and the adjacent hole 128 may also be ¾ inch. Such an arrangement may provide some ease of operation when vertical panel(s) 106 is to be positioned or repositioned relative to main panel 104. This is because each incremental lateral movement from one hole 128 to the adjacent hole 128 would correspond to the thickness of vertical panel(s) 106 so that the thickness of vertical panel(s) 106 is an factor that has already been accounted for in the process of determining where to position a vertical panel 106. In contrast, if the lateral distance "d" between one hole 128 and the adjacent hole 128 is not substantially the same as the thickness of a vertical panel 106, the thickness of vertical panel(s) 106 would need to be separately considered when determining where to position a vertical panel 106.

Hangers 146 may be spaced apart at any desired locations along main panel 104. For example, to laterally space hangers 146 apart in an even manner, adjacent hangers 146 may be separated by the same number of holes 128.

When a hanger 146 is at a desired lateral position, a nail or screw may be used to hold hanger 146 in the desired lateral position along main panel 104 by inserting the nail or screw through an aperture in the hanger 146 and into hole 128.

In some alternative embodiments, holes 128 are spaced apart laterally in some uneven manner. For example, holes 128 may be present only in certain segments of top edge 116 and/or bottom edge 118 of main panel 104. Holes 128 may be grouped in lateral clusters (not shown). A few holes 128 forming a first cluster may be present at a location that is about 9 inches from first (left) side edge 120 and then another few holes 127 forming a second cluster may be present at a location that is about 18 inches from first (left) side edge 120 and so on. Such clusters may be provided at locations where it is estimated that users are most likely to want to mount vertical panels 106 to main panel 104. An advantage of providing clusters of holes 128 may be that miscounting holes 128 is made harder. It would be easier to count holes within one of the clusters than to count tens of holes starting either from first (left) side edge or second (right) side edge.

Holes 128 may be omitted in some alternative embodiments. Instead, markings may be present on top edge 116 or bottom edge 118 of main panel 104 to show where hangers 146 could be positioned. In some embodiments, indicia on main panel 104 are provided near holes 128. Such indicia may assist in counting holes 128. For example, indicia may identify every fifth and/or tenth hole 128.

To guide lateral movement of hangers 146 relative to main panel 104, main panel 104 may include a first (top) longitudinally-extending track 130 that extends along top edge 116 and/or a second (bottom) longitudinally-extending track 132 that extends along bottom edge 118. Longitudinally-extending tracks 130, 132 may have any suitable configurations, some of which are shown in FIG. 5 (a rabbet configuration) and FIGS. 21 and 22 (a groove configuration).

FIG. 5 show first (top) and second (bottom) longitudinally-extending tracks 130, 132 according to a first example construction. In the embodiment of FIG. 5, first (top) longitudinally-extending track 130 includes a first (top) open rabbet 142 (or "recess" 142) formed along a rear side of top edge 116. Similarly, second (bottom) longitudinally-extending track 132 includes a second (bottom) open rabbet 144 (or "recess" 144) formed along a rear side of bottom edge 118. Here, perspective-based descriptions "front" and "rear" are used to facilitate the discussion of main panel 104. Main panel 104 has front wall 124 that presents itself to view when main panel 104 is hung onto a supporting wall and rear wall 126 that faces the supporting wall when main panel 104 is hung. The expression "outwardly" means a direction extending along transverse axis 114 and from front wall 124 to rear wall 126. The expression "inwardly" means a direction extending along transverse axis 114 and from rear wall 126 to front wall 124.

First (top) open rabbet 142 and second (bottom) open rabbet 144 each include a rail portion 134, 136 projecting/extending from a base portion 138, 140. Base portion 138, 140 may be generally flat although being generally flat is not necessary. Rail portion 134, 136 may extend perpendicularly to base portion 138, 140 although this right angle orientation is not necessary. First (top) open rabbet 142 is positioned outwardly from first (top) rail portion 134. Second (bottom) open rabbet 144 is positioned outwardly from second (bottom) rail portion 136.

When hanger 146 is moved laterally along main panel 104, a hook of hanger 146 travels along open rabbets 142, 144. Hanger 146 is not in direct contact with a supporting wall to which main panel 104 is attached. In the embodiment of FIG. 5, open rabbets 142, 144 allow hanger 146 to hold onto main panel 104. However, in some alternative embodiments, open rabbets 142, 144 (or other embodiments of longitudinally-extending tracks 130, 132) may be omitted. For example, hanger 146 may hold onto main panel 104, even when longitudinally-extending tracks 130, 132 are not present. For example, main panel 104 may be held spaced apart from a supporting wall by spacers which allow space for a hook of hanger 146 to hook over top edge 116 of main panel 104.

In some embodiments, main panel 104 is supported by a base framework, for example, to provide lower cabinets or island cabinets. In such embodiments, hanger 14 may hold onto top edge 116 of main panel 104 without the presence of longitudinally-extending tracks 130, 132.

Figure 21:
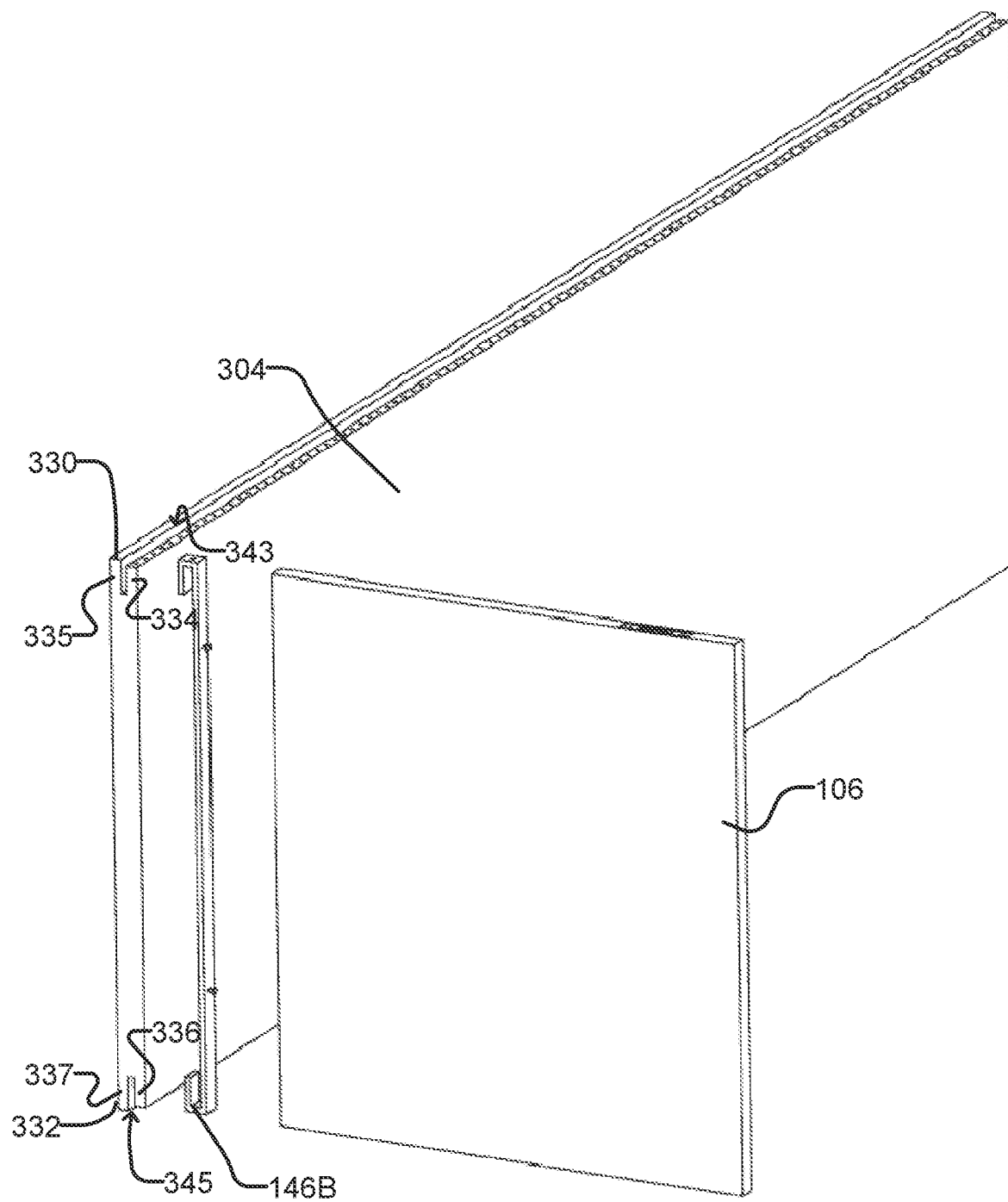
FIG. 21 is a perspective view of the vertical panel-hanger assembly of FIG. 20A being coupled to a second main panel.
Figure 22:
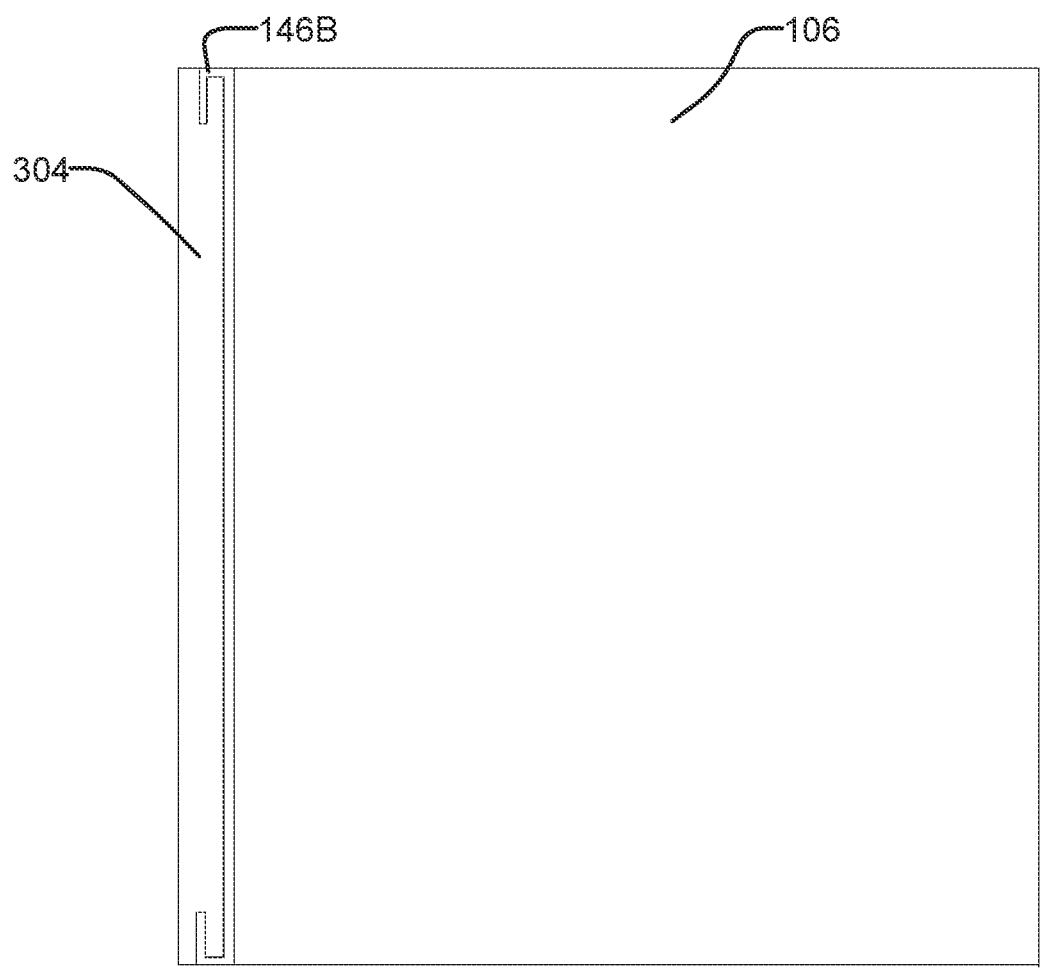
FIG. 22 is a side elevation view of assembled cabinets using the vertical panel-hanger assembly and the main panel of FIG. 21.

A person skilled in the art would appreciate that longitudinally-extending tracks 130 and/or 132 may have alternative constructions. Where longitudinally-extending tracks 130, 132 include rabbets (or recesses) 142, 144, such rabbets (recesses) may be provided in alternative constructions. For example, FIGS. 21 and 22 show a main panel 304 according to an alternative embodiment. First (top) and second (bottom) longitudinally-extending tracks 330, 332 each include a rail portion 334, 336 and an outwardly spaced flange 335, 337. Together rail portion 334, 336 and flange 335, 337 provide a groove 343, 345 spaced outwardly from rail portion 334, 336. The expression "outwardly" means a direction extending along transverse axis 314 and from front wall 324 to rear wall 326 (see FIG. 22). The expression "inwardly" means a direction extending along transverse axis 314 and from rear wall 326 to front wall 324.

Grooves 343, 345 function in a similar manner as recesses 142, 144. Flanges 335, 337 may help to prevent contact between hangers 146 and a supporting wall that main panel 304 may be attached to. Flanges 335, 337 may have a vertical height that is larger than that of rail portion 334, 336 so that flanges 335, 337 extend vertically beyond rail portion 334, 336. This allows top panel 108 and bottom panel 110 to be in direct contact with flanges 335, 337, thereby to be in direct contact with main panel 104 while permitting hooks of hangers 146 to hang over rail portions 334, 336.

With respect to vertical panels 106, better shown in FIGS. 3, 7A-7B, and 8A-8B, vertical panels 106 function as partitioning or end members to define separate cabinet compartments of frame structure 102. The spatial relationship between vertical panels 106 and main panel 104 decides whether vertical panels 106 provide partitioning or end members of frame structure 102. For example, when a vertical panel 106 is coupled to first (left) side edge 120 or second (right) side edge 122 of main panel 104, the vertical panel 106 functions as a end member of frame structure 102.

Vertical panels 106 may be coupled to first and second side edges 120, 122 of main panel 104 in a manner such that vertical panels 106 terminate flush with first (left) side edge 120 and second (right) side edge 122 of main panel 104, respectively. When a vertical panel 106 is positioned between two other vertical panels 106, the middle vertical panel 106 provides a partition member of frame structure 102 to form separate cabinet compartments on either side of the middle vertical panel member 106. When vertical panels 106 function as partition members, each one of vertical panels 106 may serve as sidewalls for two separate cabinet units and thereby, this may lead to lead to manufacturing cost savings and environmental benefits because less raw materials are required.

Vertical panels 106 are set up in the same direction, i.e. a front direction 152 parallel to transverse axis 114, relative to main panel 104. Vertical panels 106 are positioned in a laterally spaced relationship along longitudinal axis 112 of main panel 104 and in parallel planes each being orthogonal to longitudinal axis 112 of main panel 104.

Vertical panels 106 are each generally rectangular in shape. Vertical panels 106 each have a vertical height "h" that is substantially equal to the vertical height "h" of main panel 104, a transverse depth that defines the depth of frame structure 102, and a thickness. Vertical panels 106 may have top edges 148 and bottom edges 150 aligned with top edge 116 and bottom edge 118 of main panel 104, except that main panel 104 may be slightly shorter in the vertical dimension than vertical panels 106 to account for the thickness of hooks 185, 187 of hangers 146. In some embodiments, vertical panel 106 may be supplied with dimensions as follows:

vertical height: 30 inches, 35 inches or 40 inches;
transverse depth: 12 inches; and
thickness: ¾ inch or 1 inch.

As a person skilled in the art would understand, vertical panel 106 may have any other suitable shape and/or dimensions. Additionally, vertical panels 106 that are intended to function as end members of frame structure 102 may be distinguishable from vertical panels 106 that are intended to function as partitioning members of frame structure 102. For example, it may be desirable for vertical panels 106 intended to function as end members to be covered by veneer for an attractive appearance and/or protection. In contrast, it may not be necessary for vertical panels 106 intended to function as partitioning members to be covered by veneer because it may not be a concern for partitioning members to have the same appearance as panels exposed on the outside of frame structure 102 and/or it may be desirable for the walls of panels in the interior of the cabinet to have a different appearance or surface characteristics.

Vertical panels 106 and main panel 104 are slidably coupled by hangers 146 so that the location of a vertical panel 106 relative to main panel 104 may be adjusted laterally along longitudinal axis 112 of main panel 104 while the cabinet is being assembled. Example arrangements of vertical panels 106, main panel 104, and hangers 146 are discussed below in relation to hangers 146 and other hardware pieces.

With vertical panels 106 positioned at desired positions along main panel 104, top panel 108 may be secured to top edges 148 of vertical panels 106. Similarly, bottom panel 110 may be secured to bottom edges 150 of vertical panels 106. The attachment of vertical panels 106 to top and/or bottom panels 108, 110 holds vertical panels 106 perpendicular to main panel 104 and helps to maintain a desired spacing of vertical panels 106.

In addition to hangers 146, panel components may optionally be held together by other hardware pieces as described elsewhere herein to provide frame structure 102.

Figure 4:
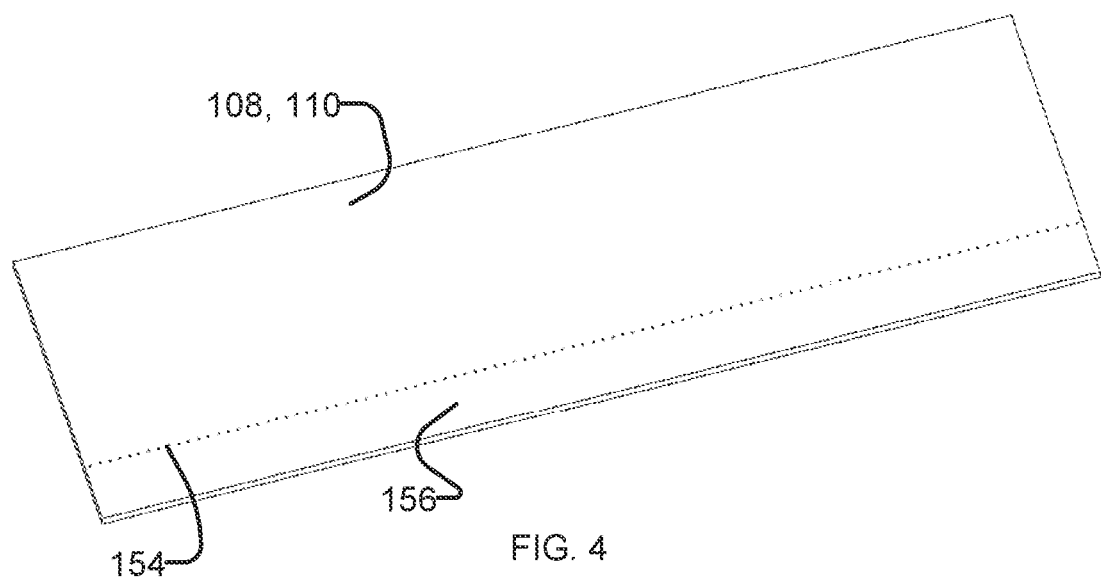
FIG. 4 is a perspective view of the top panel and the bottom panel of the upper cabinets of FIG. 1.

As shown in FIG. 4, top panel 108 and bottom panel 110 may be interchangeable and may have the same structural features. Top panel 108 and bottom panel 110 each may be generally rectangular in shape. For example, in some embodiments top and bottom panels 108, 110 may be supplied with the following dimensions:

lateral length: 96 inches;
transverse depth: 12¾ inches;
thickness: ¾ inch or 1 inch.

If necessary, top and bottom panels 108, 110 may be cut to match the length of a main panel 104 or two or more top and bottom panel sections may be combined. As a person skilled in the art would appreciate, top panel 108 and bottom panel 110 may have any other suitable shape and/or dimensions. Top panel 108 and bottom panel 110 may have widths equal to widths of vertical panels 106 plus the thickness of main panel 104. Top panel 108 and bottom panel 110 may have lengths equal to a length of main panel 104.

In the context of the overall geometry of frame structure 102, top panel 108 closes the top side of cabinets 100 and bottom panel 110 closes the bottom side of cabinets 100. In some alternative embodiments, only one of top panel 108 or bottom panel 110 is present to hold the vertical panels against lateral movement relative to the main panel. For example, top panel 108 may be omitted, when vertical panels 106 abut a ceiling and the ceiling contributes to the physical integrity of cabinets 100. Bottom panel 110 may be omitted, for example, when vertical panels 106 stand directly on a floor to provide lower cabinets.

Top panel 108 and bottom panel 110 may have blind holes 154 bored on an inner surface 156. Blind holes 154 may not penetrate through the entire thickness of the panel 108, 110. Holes 154 may be used as guides, which indicate where to place certain hardware pieces on top panel 108 and/or bottom panel 110 to couple top panel 108 and/or bottom panel 110 to vertical panels 106 to support a desired spacing of vertical panels 106 and/or as pilot holes for attachment of the hardware pieces.

Similar to holes 128 bored on top edge 116 and/or bottom edge 118 of main panel 104, holes 154 may be spaced apart in a direction parallel to longitudinal axis 112 in an even manner. In some embodiments, the lateral center-to-centre distance "d" between one hole 154 and an adjacent one of holes 154 is substantially the same as the thickness of a vertical panel 106. In some alternative embodiments, holes 154 may be spaced apart laterally in some uneven manner. For example, holes 154 may be grouped in lateral clusters (not shown), for example in one of the same manners described above for holes 128 on main panel 104. The consistency between the placement of holes 154 on top panel 108 and/or bottom panel 110 and holes 128 on main panel 104 may simplify the assembling process at least because the locations where certain hardware pieces should be placed can be determined using the same method. This aspect may become more clear in view of the below description in relation to hangers 146 and hardware pieces.

Hangers 146 are configured to slidably couple vertical panels 106 to main panel 104. Better shown in FIGS. 6A and 6B, hanger 146 has an elongated body 158 that, in use, extends in a direction that is parallel to vertical direction 113 and is orthogonal to longitudinal axis 112 of main body 104. Elongated body 158 may have a width that is substantially equal to a thickness of the vertical panel to which it is attached. Elongated body 158 has first (vertical-panel-facing) 160 and second (main-panel-facing) 162 opposed surfaces. Hanger 146 is oriented so that first (vertical-panel-facing) surface 160 is positioned to engage a side edge 164 (see FIGS. 8A and 8B) of a vertical panel 160. Second (main-panel-facing) surface 162 is positioned to engage front wall 124 (see FIG. 5) of main panel 104. Elongated body 158 may have a vertical length that corresponds substantially to the vertical height of main panel 104 so that elongated body 158 runs from about top edge 116 to about bottom edge 118 of main panel 104.

Vertical panels 106 are attached to hangers 146. This attachment may be done in any suitable manner (e.g. with screws). In some embodiments, attachment of hanger 146 to a vertical panel 106 is provided by hardware that is attached to panel 106 that is engageable with structural features of hanger 146. The structural features of hanger 146 may, for example be provided by hardware pieces that are secured to or integrally formed with elongated body 158 of hanger 146. These hardware pieces may be configured to and adapted to engage some other hardware pieces mounted on a vertical panel 106 so that the vertical panel 106 can be coupled, optionally detachably coupled, to hanger 146.

Some example hardware pieces (or "couplings") include anchor screws or pins 166 (or simply "anchors") and corresponding keyhole hangers. Example keyhole hangers 168 are illustrated in FIGS. 7A-B, 8A-B, 9A-C, and 10A-B. Anchors 166 are secured to elongated body 158 of hanger 146 and protrude in front direction 152 from vertical-panel-facing surface 160. Anchors 166 each have an enlarged head 170 configured to engage a corresponding keyhole hanger 168. Keyhole hangers 168 are secured to vertical panel 106. In some embodiments, better shown in FIG. 8B, keyhole hangers 168 may be mounted within recessed portions 172 of a vertical panel 106. The presence of recessed portions 172 permits (i) direct contact between side edge 164 of vertical panel 106 with first (vertical-panel-facing) surface 160 of hanger 146, (ii) direct contact between top edge 148 of vertical panel 106 and top panel 108, and/or (iii) direct contact between bottom edge 150 of vertical panel 106 and bottom panel 110.

Keyhole hangers 168 each have a mounting plate 174 defining a keyhole opening 178 therein. Keyhole opening 178 may be viewed as an inverted T-shaped or keyhole-shaped channel with a larger width head portion 180 and a smaller width leg portion 182. Better shown in FIG. 8B, extending inwardly from top and bottom ends of mounting plate 174 are first and second feet 176a, 176b. Keyhole hangers 168 are secured to vertical panels 106 within recessed portions 172 by coupling first and second feet 176a, 176 to vertical panels 106 for example via screws, nails, or the like.

Mounting plate 174 is positioned spaced away from an inner surface of vertical panel 106 to define a space between mounting plate 174 and the inner surface of vertical panel 106. The space receives enlarged head 170 of anchor 166 when enlarged head 170 engages keyhole hanger 168 by protruding through keyhole opening 178 and into the space. Keyhole hangers 168 may be configured to draw anchors 166 farther into keyhole opening 178 as head 170 travels along leg portion 182.

FIGS. 9A-9C and FIGS. 10A-10B illustrate how a vertical panel 106 may be detachably couple to a hanger 146. Vertical panel 106 and hanger 146 are coupled together by engaging enlarged head 170 of anchor 166 with keyhole opening 178 of keyhole hanger 168. Enlarged head 170 of anchor 166 enters larger width head portion 180. When enlarged head 170 protrudes through smaller width leg portion 182 of keyhole opening 178, vertical panel 106 is securely coupled to hanger 146. To detach vertical panel 106 from hanger 146, enlarged head 170 of anchor 166 exits from larger width head portion 180 of keyhole opening 178 to free vertical panel 106 from hanger 146. As shown in FIGS. 9A-9B and 10A-10B, keyhole hanger 168 (and its keyhole opening 178) may be oriented so as to allow vertical panels 106 to be held on corresponding hangers 146 by gravity.

A vertical panel 106 may be hung from a hanger 146 by inserting enlarged head 170 of anchor 166 through larger wide head portion 180 of keyhole opening 178 and the force of gravity (either with or without the assistance of external manual force) would then lower vertical panel 106 relative to hanger 146 so that enlarged head 170 moves through keyhole opening 178 and protrudes through smaller width leg portion 182. To remove vertical panel 106 from hanger 146, vertical panel 106 is lifted upwardly relative to hanger 146 so that enlarged head 170 of anchor 166 could move through smaller width leg portion 182 and then exit from larger width head portion 180 of keyhole opening 178.

As shown in FIG. 3, anchors 166 and corresponding keyhole hangers 168 may be provided to detachably couple vertical panels 106 to top panel 108 and/or to detachably couple vertical panels 106 to bottom panel 110. Anchors 166 are secured at selected locations (e.g. at appropriate holes 154) of top panel 108 and bottom panel 110. Enlarged heads 170 of anchors 166 secured on top panel 108 and/or bottom panel 110 then engage corresponding keyhole hangers 168 mounted within recessed portions 172 on top edges 148 and/or bottom edges 150 of vertical panels 106. For example, keyhole opening 178 may be oriented so as to allow top panel 108 and/or bottom panel 110 to be secured to vertical panels 106 by pushing top panel 108 and/or bottom panel 110 towards main panel 104.

A person skilled in the art would appreciate that other suitable fasteners can be used to couple vertical panel(s) 106 to hanger(s) 146 and/or to couple top and/or bottom panels 108/110 to vertical panels 106.

Returning to FIGS. 6A and 6B, structural features of hangers 146 will be discussed. Broadly speaking, hanger 146 includes a first (top) end bracket 184 at a top end of elongated body 158, and at the opposite end of elongated body 158, there may be a second (bottom) end bracket 186. In some embodiments, such as the one shown in FIGS. 16A and 16B, second (bottom) end bracket 186 is omitted. First (top) end bracket 184 includes a first (top) hook 185 that is configured and adapted to receive top edge 116 of main panel 104. Similarly, second (bottom) end bracket 186, when present, may include a second (bottom) hook 187 is configured and adapted to receive bottom edge 118 of main panel 104. Additionally, first (top) end bracket 184 and second (bottom) end bracket 186 may be configured and adapted to slide respectively along top edge 116 and bottom edge 118 of main panel 104 to allow hanger 146 (optionally together with an attached vertical panel 106) to be moved laterally along longitudinal axis 112 of main panel 104 to a desired location.

First (top) hook 185 and second (bottom) hook 187 (when second (bottom) hook 187 is present) can have any suitable configurations as long as they are configured and adapted to receive top edge 116 and bottom edge 118 of main panel 104. In the embodiment of FIGS. 6A and 6B, first (top) hook 185 includes an arm 188 that is generally parallel to and spaced away from elongated body 158. First (top) hook 185 includes an intermediate portion 190 connecting arm 188 with elongated body 158. Arm 188, intermediate portion 190 and elongated body 158 may be in the same plane as one another. Arm 188, intermediate portion 190 and elongated body 158 provide a U-shaped channel 192 dimensioned to receive top edge 116 of main panel 104. Arm 188 and elongated body 158 define the arms of U-shaped channel 192 and intermediate portion 190 defines the base of U-shaped channel 192.

Still with reference to FIGS. 6A and 6B, second (bottom) hook 187 includes an arm 194 that is generally parallel to and spaced away from elongated body 158. Arm 188 and arm 194 are positioned on the same side relative to elongated body 158 and may extend towards each other. Second (bottom) hook 187 includes an intermediate portion 196 connecting arm 194 with elongated body 158. Arm 194, intermediate portion 196 and elongated body 158 may be in the same plane as one another. Intermediate portion 196 may be flat and parallel to top edge 116 of main panel 104 and this construction may facilitate the lateral sliding movement of intermediate portion 196 along main panel 104. This construction may also provide a relatively low profile of intermediate portion 196. Arm 194, intermediate portion 196, and elongated body 158 provide a U-shaped channel 198 for receiving bottom edge 118 of main panel 104, whereby arm 194 and elongated body 158 define the arms of U-shaped channel 198 and intermediate portion 196 defines the base of U-shaped channel 198. The opening direction of top U-shaped channel 192 and the opening direction of bottom U-shaped channel 198 face each other.

In the embodiment of FIGS. 6A and 6B, second (bottom) end bracket 186 defines a second channel 199 that is oriented orthogonally to bottom U-shaped channel 198. Second channel 199 is configured and adapted to receive and support bottom panel 110. A number of configurations may be suitable to define second channel 199. According to the embodiment of FIGS. 6A and 6B, second (bottom) end bracket 186 includes a second arm 197 spaced apart from intermediate portion 196 and projecting in a direction that is substantially parallel to intermediate portion 196. Second end bracket 186 also includes a third arm 195 connecting intermediate portion 196 and second arm 197. Third arm 195 is in the same plane as first arm 194. Intermediate portion 196, second arm 197, and third arm 195 provide second U-shaped channel 199, whereby intermediate portion 196 and second arm 197 define the arms of U-shaped channel 199 and third arm 195 defines the base of U-shaped channel 199. The opening directions of bottom U-shaped channel 198 and second U-shaped channel 199 are orthogonal to one another.

A person skilled in the art would appreciate that hangers 146 may have other end bracket configurations. An alternative hanger embodiment 146A is illustrated in FIGS. 12A and 12B. Hanger 146A is similar to hanger 146 and like elements are indicated with like reference numbers with an added letter "A".

A main difference between hanger 146 and hanger 146A is that hanger 146A has first (top) end bracket 184A and second (bottom) end bracket 186A that are a mirror image of each other. First (top) hook 185A and second (bottom) hook 186A are configured to and adapted to receive top edge 116 and bottom edge 118 of main panel 104. Additionally, first (top) bracket 184A and second (bottom) bracket 186A each include a second channel 199A, 193A that are configured to and adapted to receive and support top panel 108 and bottom panel 110.

To be able to hang onto main panel 104 and to receive top panel 108 and bottom panel 110, first (top) bracket 184A and second (bottom) bracket 186A may be of any suitable configurations. In the embodiment of FIGS. 12A and 12B, hanger 146A has a second (bottom) end bracket 186A that is identical to second (bottom) end bracket 186 of hanger 146. Additionally, hanger 146A has first (top) end bracket 184A that is a mirror image of second (bottom) end bracket 186A. First (top) end bracket 184A provides a second top U-shaped channel 193A for receiving and supporting top panel 108.

Another alternative hanger 246 is illustrated in FIGS. 16A and 16B. Hanger 246 is similar to hanger 146 and like elements are illustrated with like reference numbers incremented by 100. A main difference between hanger 246 and hanger 146 is that hanger 246 does not have a second (bottom) bracket. Hanger 246 has a first (top) end bracket 284. First (top) end bracket 284 is configured to and adapted to receive and/or slide along top edge 116 of main panel 104. Additionally, first (top) end bracket 284 may be configured and adapted to receive and support top panel 108.

To be able to hang onto main panel 104 and to receive top panel 108, first (top) bracket 284 may be of any suitable configurations. In the embodiment of FIGS. 16A and 16B, first (top) end bracket 284 is identical to first (top) end bracket 184 of hanger 146, wherein a top hook 285 is provided. In some other embodiments, first (top) end bracket 284 may be identical to first (top) end bracket 184A of hanger 146A, wherein a top hook 285 is provided for hanging over top edge 116 of main panel 104 and a second top U-shaped channel 293 is provided for receiving and supporting top panel 108. The bottom end of hanger 246 does not provide any bracket structures and may not have any direct contact with bottom panel 210.

Yet another alternative hanger 146B embodiment is illustrated in FIGS. 19A-19B and 20A-20B. Hanger 146B is similar to hanger 146 and like elements are illustrated with like reference numbers with an added letter "B". A main difference between hanger 146B and hanger 146 is that second channel 199 is omitted. Instead, hanger 146B shown in FIGS. 19A-19B and 20A-20B includes top hook 185B and bottom hook 187B respectively configured to receive top edge 116 and bottom edge 118 of main panel 104.

These illustrated embodiments of hangers 146, 146A, 146B, 246 show that hangers may have any suitable configurations as long as they are adapted to engage, optionally slideably engage, top edge 116 of main panel 104. For example, hangers 146, 146A, 146B, 246 include a top hook for hanging onto top edge 116 of main panel 104. Hangers may include a bottom hook for receiving bottom edge 118 of main panel 104. Hangers may include channels/receivers for receiving and supporting top panel 108 and/or bottom panel 110. To connect hangers with different panel components, hangers may include built-in features such as holes, anchors, or other attached hardware piece(s).

Returning to FIG. 5, to guide the lateral movement of hangers 146 (and thereby vertical panels 106 coupled thereto) relative to main panel 104 or to provide some space for hangers 146 to slide without causing damage to a supporting wall to which main panel 104 may be secured to, main panel 104 includes first (top) longitudinally-extending track 130 constructed on top edge 116 and second (bottom) longitudinally-extending track 132 constructed on bottom edge 118. As discussed above, first (top) and second (bottom) longitudinally-extending tracks 130, 132 function to guide the lateral movement of hangers 146 (and thereby vertical panels 106 coupled thereto) relative to main panel 104 or to provide some space for hangers 146 to slide without causing damage to a supporting wall to which main panel 104 is secured. When hanger 146 slides laterally along main panel 104, arms 188, 194 of hanger 146 moves within respective recesses 142, 144 without being in direct contact with a supporting wall (not shown) to which the main panel may be secured to so that the lateral movement of hanger 146 does not cause damage to the supporting wall.

Recesses 142, 144 (or other similar structures) may be provided by alternative embodiments such as the one 304 shown in FIGS. 21 and 22. Main panel 304 is similar to main panel 104 and like elements are illustrated with like reference numerals incremented by 200. First (top) and second (bottom) longitudinally-extending tracks 330, 332 each include a rail portion 334, 336 and an outwardly spaced flange 335, 337, together rail portion 334, 336 and flange 335, 337 providing a groove 343, 345 spaced outwardly from rail portion 334, 336. Rail portions 334, 336 are configured and adapted to be received by U-shaped channels 192, 198, 192A, 198A, 192B, 198B of hanger 146, 146A, 146B. When hanger 146, 146A, 146B slides laterally along main panel 304, arms 190, 194, 190A, 194A, 190B, 194B move in grooves 343, 345 without being in direct contact with a supporting wall (not shown) to which the main panel may be secured to so that the lateral movement of hanger 146, 146A, 146B would not cause damage to the supporting wall. Rail portion 334, 336 may have a vertical height that is shorter than that of flange 335, 337 so that flange 335, 337 is in direct contact with top panel 108 or bottom panel 110 and no gap would be visible therebetween.

A person skilled in the art would understand that the above-described plurality of panel components and the assortment of hardware pieces may be sold as a cabinet assembly system, such as a ready-to-assemble cabinet system kit. The system may also include an assembly instruction manual. Also, the panel components may be packaged and sold as individual components. Alternatively, some of the panel components may be packaged and sold pre-assembled as a sub-assembly so that assembly time by consumers may be reduced.

Figure 11A:
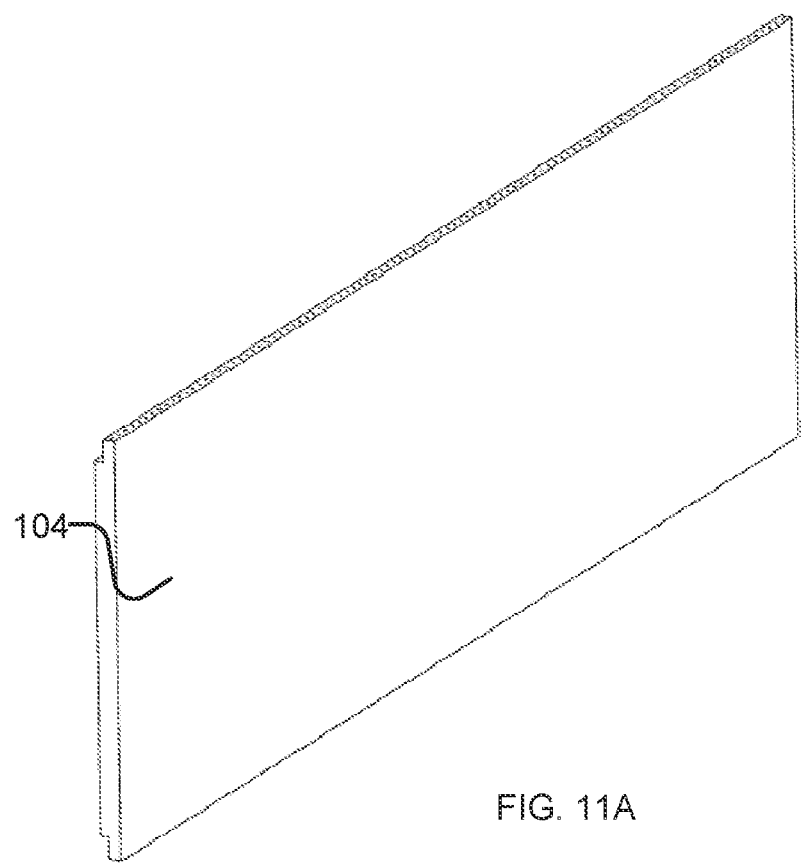
FIGS. 11A-11D illustrate the process to assembly the upper cabinets of FIG. 1.
Figure 11B:
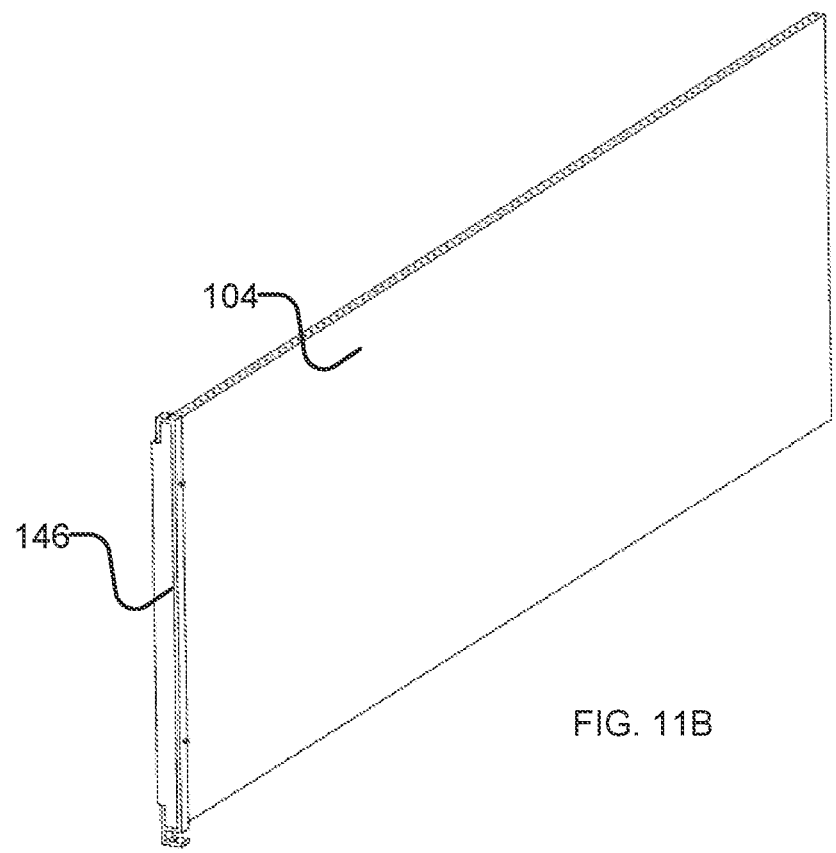
Figure 11C:
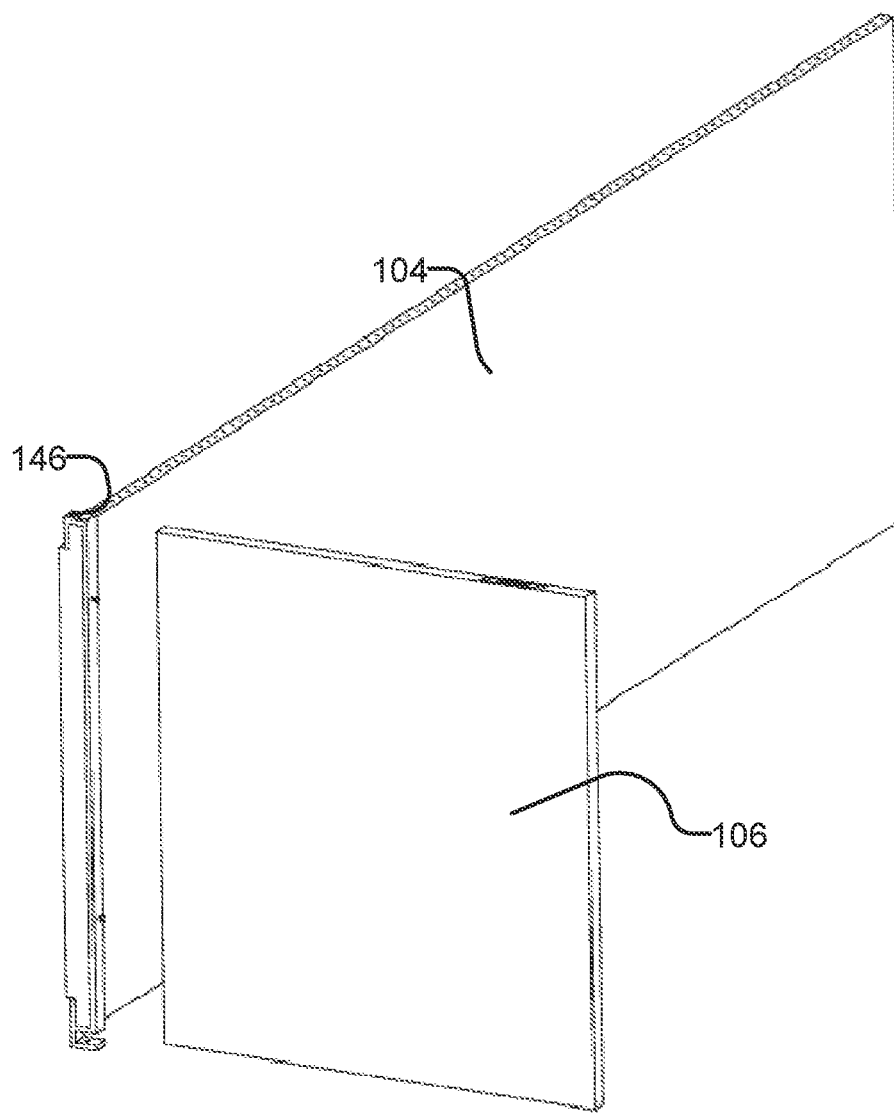
Figure 11D:
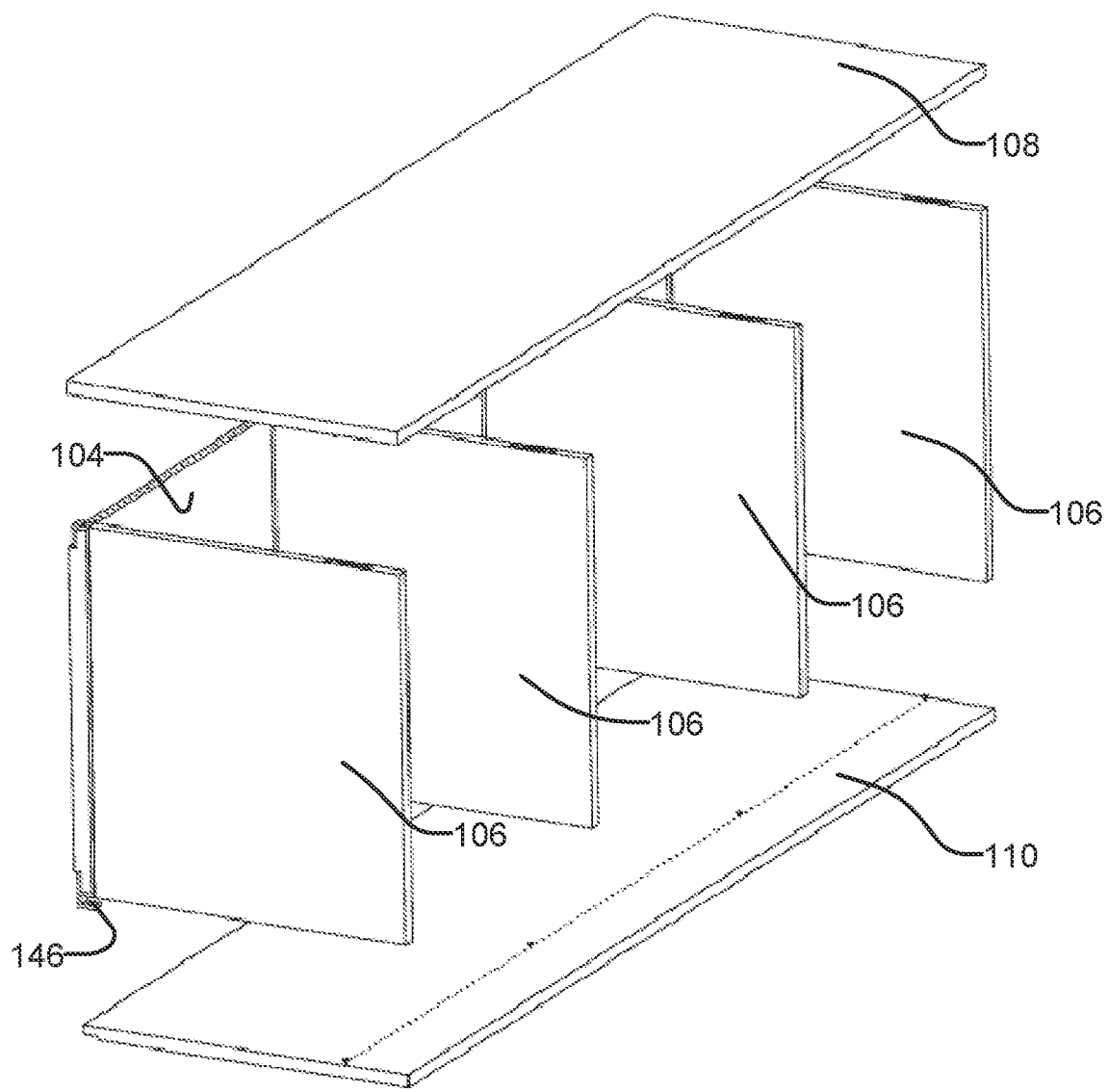
Figure 13:
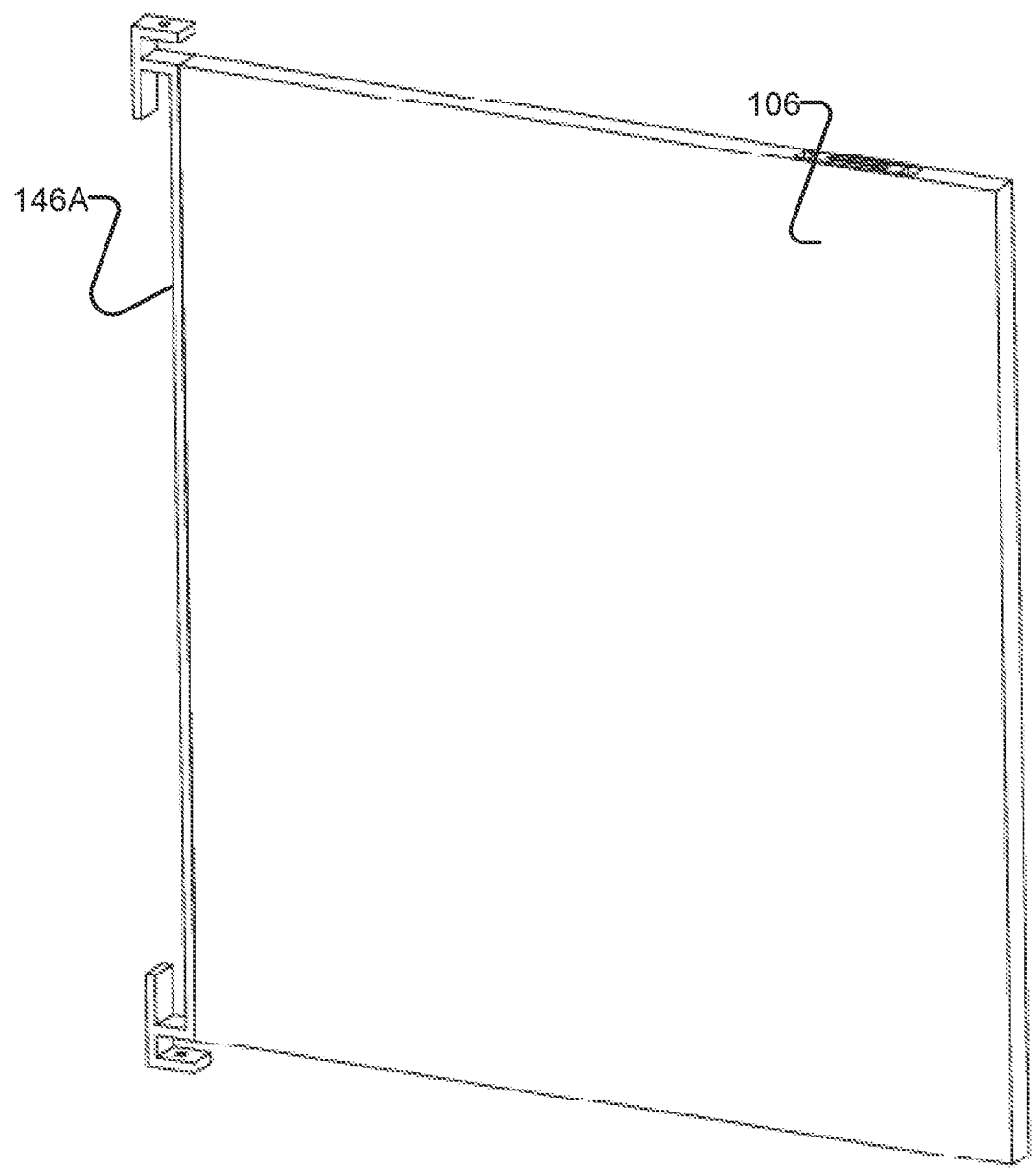
FIG. 13 is a perspective view of a vertical panel coupled to the hanger of FIG. 12A.

FIG. 11A—illustrate a method of cabinet construction 600 applied to assembling upper cabinets 100. At step 602, main panel 104 is secured onto a supporting wall (not shown) so that an orientation of main panel 104 is maintained. Main panel 104 may be mounted to studs of a wall to support the weight of the eventually-assembled frame structure 102. The orientation of main panel 104 may be orthogonal to a floor (not shown). In some other embodiments, instead of attaching main panel 104 to a supporting wall, main panel may be secured to or on a supporting surface. The supporting surface may be provided by a base structure to maintain an orientation of main panel 104.

At step 604, hangers 146 are coupled to vertical panels 106, if they are not coupled together already.

At step 606, hangers 146 are coupled to main panel 104. Hangers 146 may be slidably coupled to main panel 146. For example, hangers 146 may each have hooks 185, 187 on opposed ends and at step 606, hooks 185, 187 are hooked over top edge 116 and bottom edge 118 of main panel 104.

Step 604 may occur after step 606. In such embodiments, once a hanger 146 has been coupled to main panel 104, a vertical panel 106 is then coupled to hanger 146. Hanger 146 may be slid laterally along longitudinal axis 112 of main panel 104, which leads vertical panel 106 coupled to hanger 146 to also move laterally along longitudinal axis 112.

At step 608, once a desired longitudinal location of hanger 146 relative to main panel 104 is reached, hanger 146 is fastened at the desired longitudinal location so that hanger 146 can no longer move relatively to main panel 104. If further adjustment is desirable, hanger 146 may be unfastened so that hanger 146 can move laterally along main panel 104.

At step 610, top panel 108 is secured on top edges of vertical panels 106 to support the proper spacing of vertical panels 106. Bottom panel 110 is secured on bottom edges of vertical panels 106 to support the proper spacing of vertical panels 106. In some embodiments, only one of top panel 108 or bottom panel 110 is secured to vertical panels and the other one may be omitted. For example, top panel 108 may be omitted, when vertical panels 106 abut a ceiling and the ceiling contributes to the physical integrity of cabinets 100. Bottom panel 110 may be omitted, for example, when vertical panels 106 stand directly on a floor to provide lower cabinets. Before step 610, an optional step may occur to secure hardware pieces on top 108 and/or bottom 110 panels at locations corresponding to vertical panels 106. Top 108 and/or bottom 110 panels are then coupled to vertical panels 106.

Figure 14:
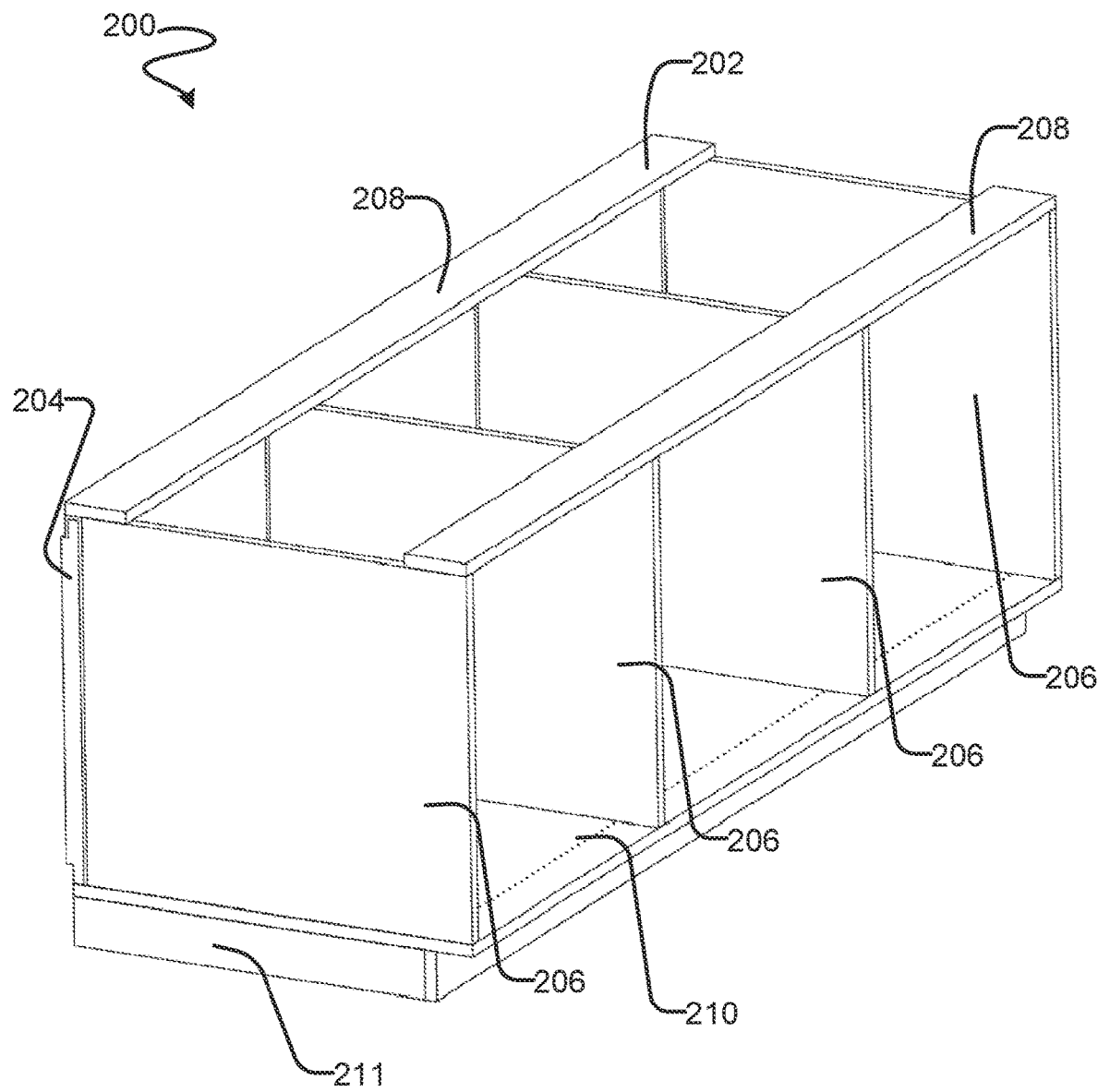
FIG. 14 is a perspective view of lower cabinets (without doors) formed from a cabinet assembly system according to a second embodiment of the present invention.
Figure 15:
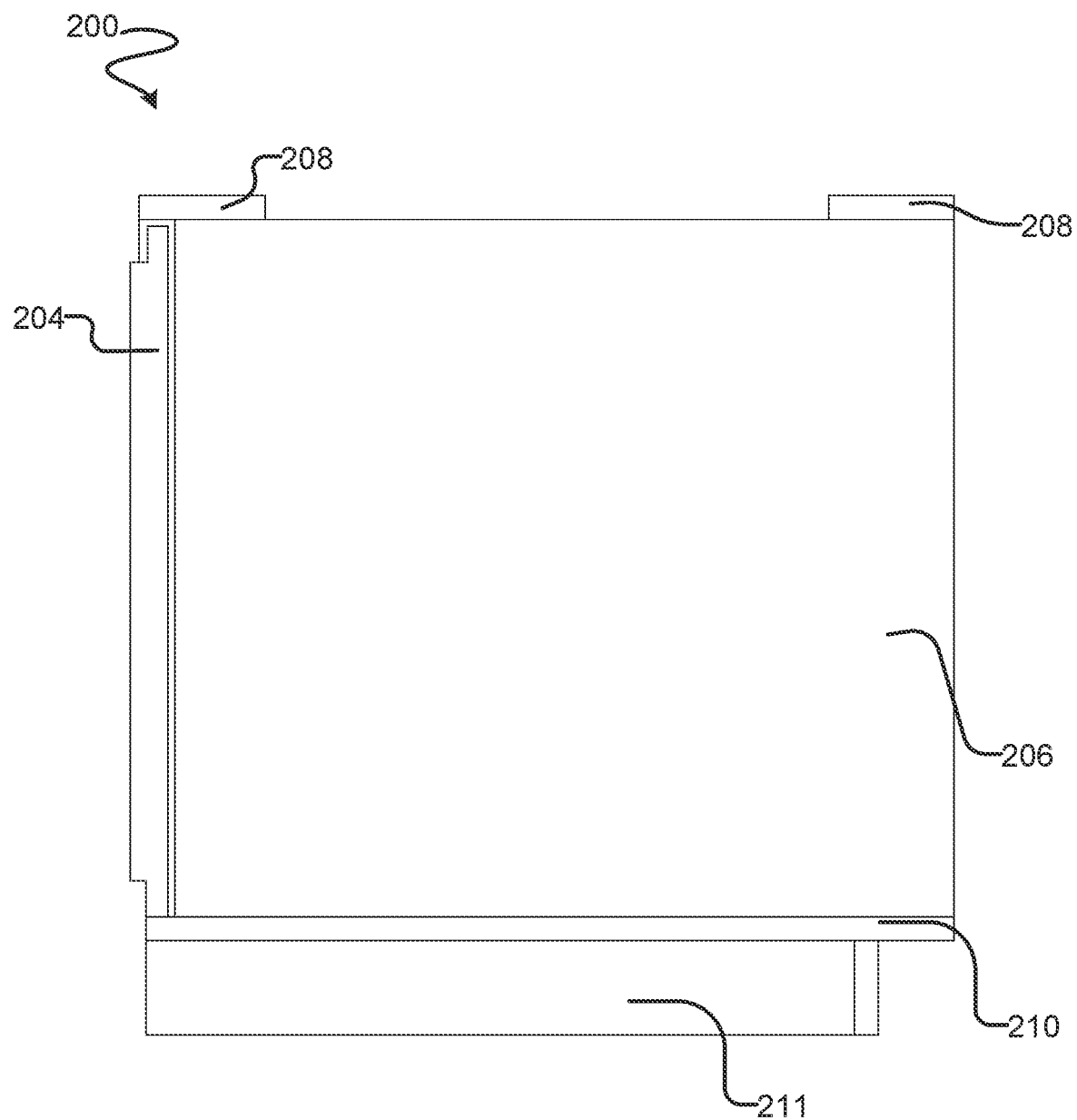
FIG. 15 is a side elevation view of the lower cabinets of FIG. 14.

The structural features of upper cabinets 100 may be incorporated in other cabinets, including lower cabinets, island cabinets, storage cabinets, wardrobes, or the like. To illustrate this, a lower cabinet with multiple cabinet units and without doors 200 (also referred to as lower cabinets 200) according are shown in FIGS. 14 and 15. Lower cabinets 200 are similar to upper cabinets 100 and like elements are illustrated with like reference numerals incremented by 100. Different than upper cabinets 100, instead of being mounted to a supporting wall, main panel 204 of lower cabinets 200 may be supported by a base structure 211. Base structure 211 may have any suitable configuration as long as it includes or is able to support and orient main panel 204 in a particular orientation, e.g. to be orthogonal to the floor. A portion of base structure 211, e.g. bottom panel 210, may be understood to be equivalent to bottom panel 110.

Hanger 246 has a first (top) end bracket 284 that is identical to first (top) end bracket 184 of hanger 146. First (top) end bracket 284 includes an arm 288 spaced outwardly from elongated body 258 and an intermediate portion 290 connecting arm 288 with elongated body 258. First (top) end bracket 284 and elongated body 258 provide a U-shaped channel 292 for receiving top edge 216 of main panel 204, whereby arm 288 and elongated body 258 define the arms of U-shaped channel 292 and intermediate portion 290 defines the base of U-shaped channel 292. In contrast to hanger 146, hanger 246 only has one end bracket—that is first (top) end bracket 284. Hanger 246 does not have a second (bottom) end bracket for receiving the bottom edge of main panel 204 as the bottom edge of main panel 204 rests directly on bottom panel 210 of base structure 211. The bottom end of hanger 246 may be positioned slightly above bottom panel 210 so that the bottom end will not cause damage to bottom panel 210 when hanger 246 is slid laterally along main panel 204. A person skilled in the art would appreciate that hanger 246 may have any suitable dimensions as long as its bottom end would not be in direct contact with bottom panel 210 to cause any damage to bottom panel 210 and as along as hanger 246 is configured to couple vertical panel 206 to main panel 204 in a stable fashion.

Figure 18A:
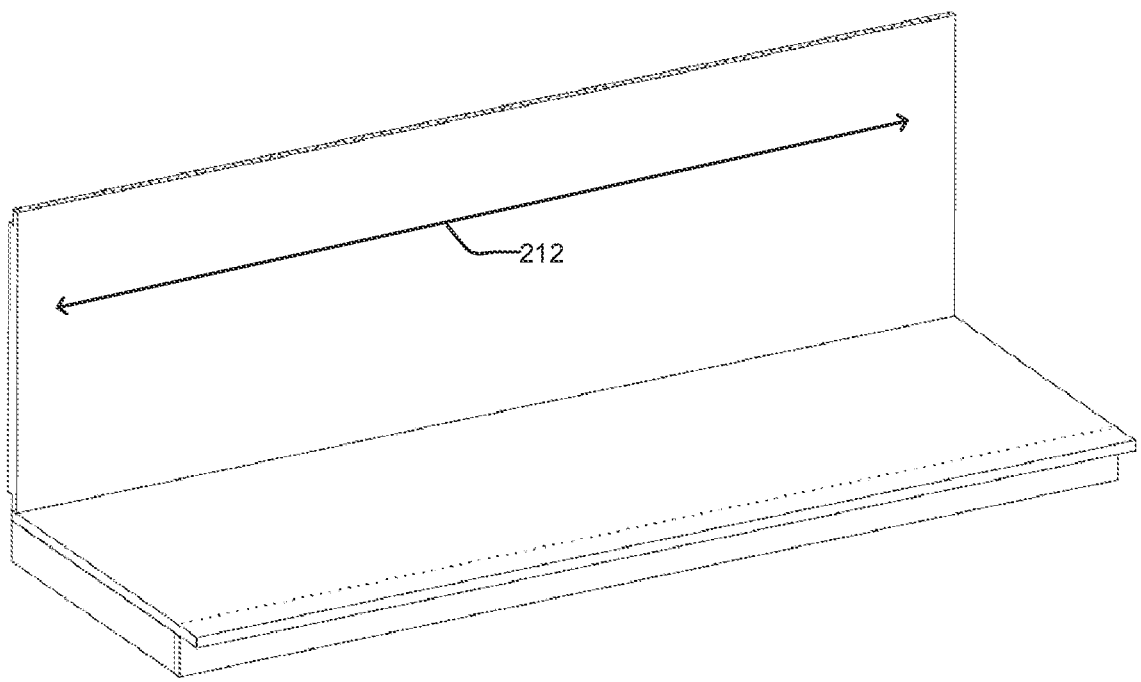
FIGS. 18A-18E illustrate the process to assembly the lower cabinets of FIG. 14
Figure 18B:
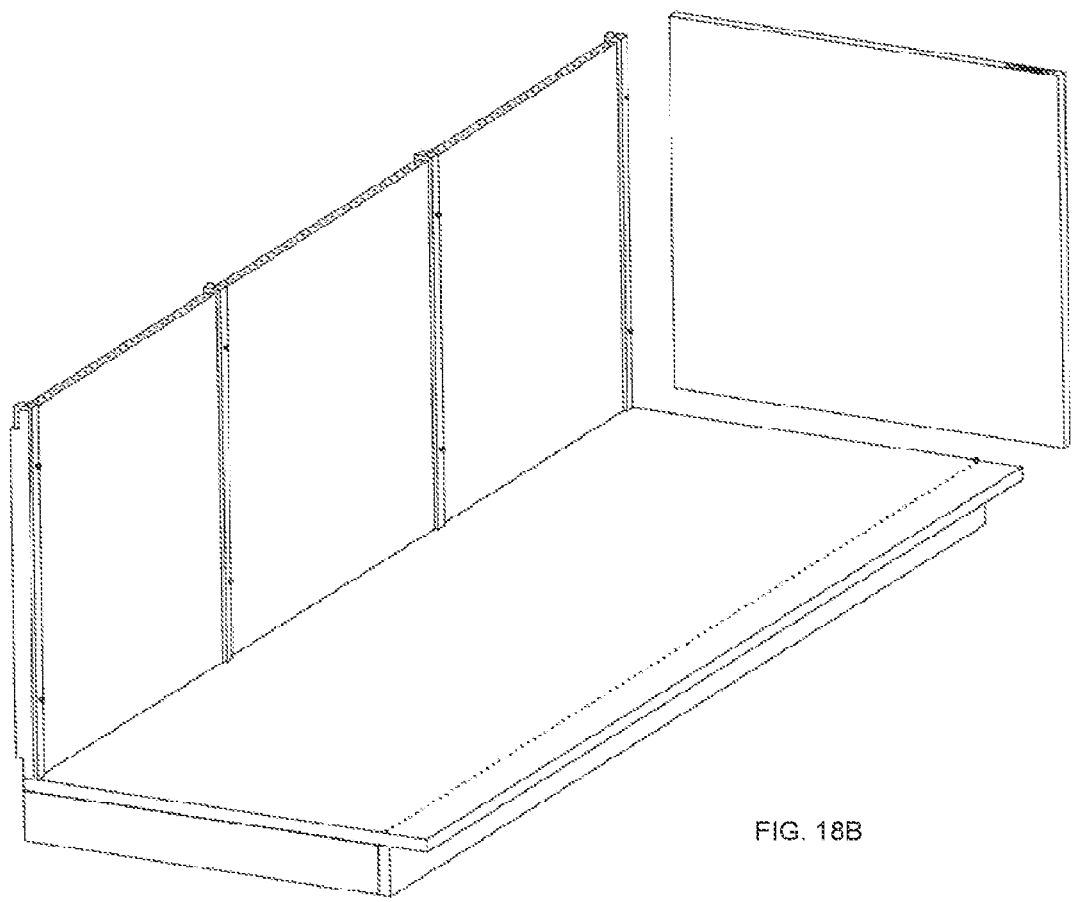
Figure 18C:
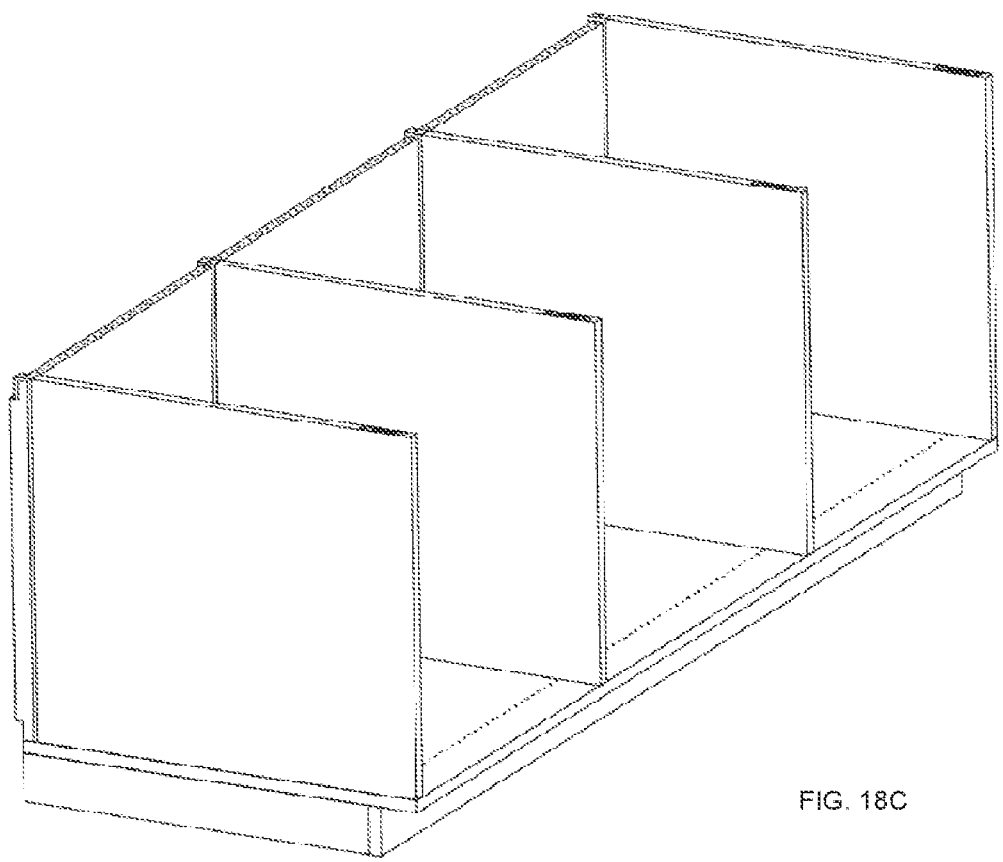
Figure 18D:
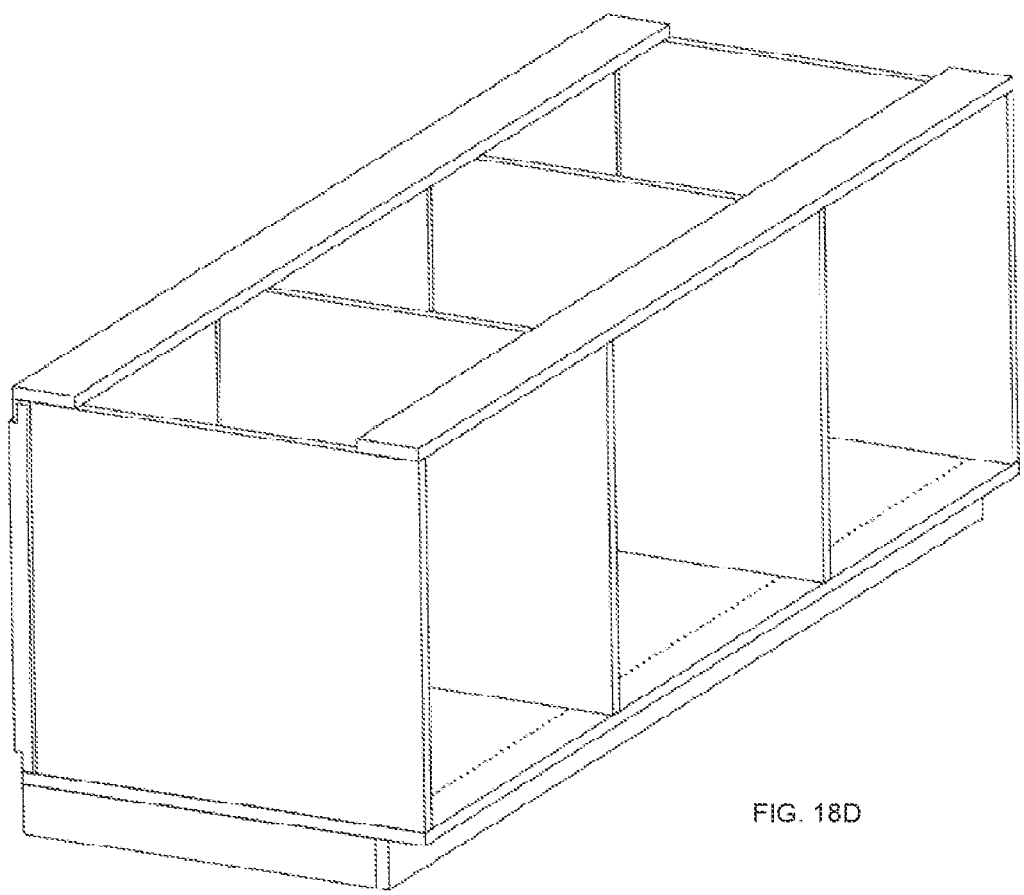
Figure 18E:
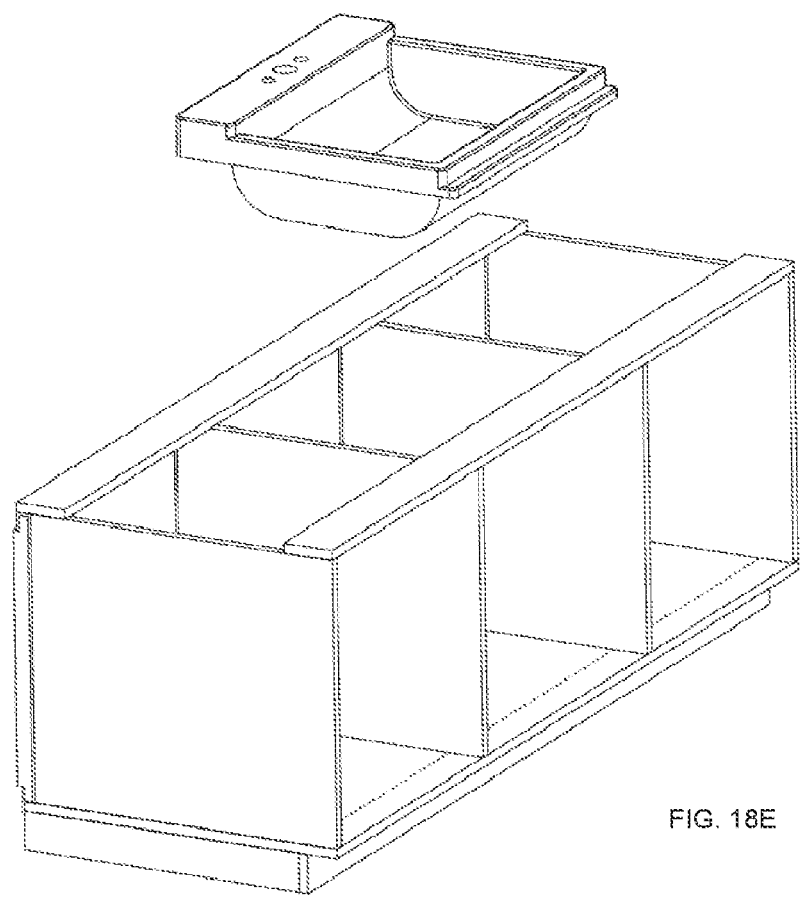
Figure 20B:
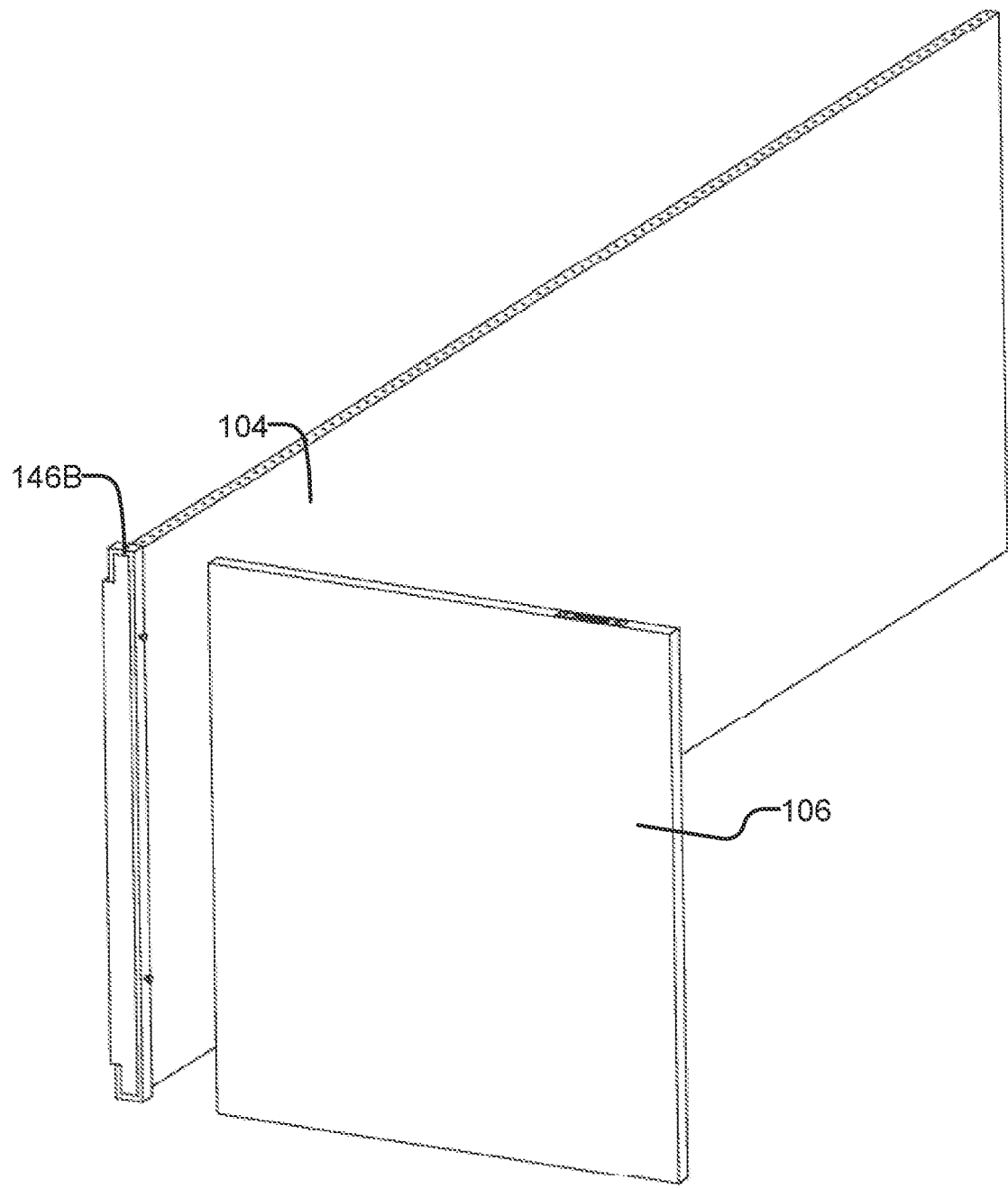
FIG. 20B is a perspective view of the vertical panel-hanger assembly of FIG. 20A being coupled to a main panel.

To secure a desired spacing of vertical panels 206 relative to main panel 204, two top boards 208 are secured to top edges of vertical panels 206. Top boards 208 are spaced apart in a transverse direction. The space created between two top boards 208 may provide a convenient way to support a sink, as shown in FIG. 18E. A sink may sit on and be supported by top boards 208, wherein the sink occupies the space created between top boards 208.

Instead of hangers 146, 146A, 146B, 246, cabinets according to the present invention may include other mounting mechanisms for coupling vertical panels to a main panel. With reference to FIGS. 23 and 24, main panel 404 of cabinets 400 has a plurality of mounting holes 401 bored on an inner surface 403 of main panel 404. Mounting holes 401 function to facilitate attachment between vertical panels 406 and main panel 404.

To assist with positioning vertical panels 406 relative to main panel 404, mounting holes 401 may be strategically spaced. For example, mounting holes 401 may be arranged in vertical rows and the vertical rows may be spaced apart laterally in an even manner. The lateral distance between one vertical row and its adjacent row may be the same as the thickness of vertical panels 406. Alternatively, vertical rows may be spaced apart laterally in some uneven matter. For example, vertical rows may be present only at certain segments, e.g. where vertical panels 406 are most often positioned relative to main panel 404, of front wall 424 of main panel 404. Vertical rows may be grouped in clusters and within each cluster, the vertical rows may be spaced apart laterally in an even manner.

As shown in FIG. 24, vertical panels 406 may, for example, be attached to main panel 404 by connecting bolts 403 with corresponding cam nuts 405. As is conventional, connecting bolts 403 each have screw threads (or threaded end) 407 on one end and a disc-shaped head (or bolt head) 409 on the other end. Threaded end 407 is screwed into main panel 404 and bolt head 409 extends into a hole formed in side edge 464 of vertical panels 406. Cam nut 405 is fitted into a hole in vertical panels 406, and cam nut 405 is positioned to communicate perpendicularly with bolt head 409. Bolt head 409 is configured to interlock with cam nut 405, whereupon cam nut 405 is rotated to tighten the connection to provide an attachment between main panel 404 and vertical panels 406. A screwdriver may be required to assemble and disassemble bolts 403 and nuts 405.

With reference to FIGS. 25 and 26, main panel 504 of cabinets 500 has a plurality of laterally spaced-apart mounting grooves 501, each extending vertically along main panel 504. Vertical panels 506 have corresponding mounting edges 503 for insertion into and engaging mounting grooves 501. As shown in FIG. 26, male and female dovetail configurations may be used to prevent movement of vertical panels 506 relative to main panel 504 in transverse direction 514.

Shelves and/or doors of appropriate widths may be added to any of the described embodiments. For example, with respect to upper cabinets 100, in cases where holes 128 are spaced apart by a lateral center-to-center distance equal to a thickness of the vertical panels 106 or a multiple of the thickness of vertical panels 128, the shelves and/or doors can have widths that are a multiple of the thickness of vertical panels.

As used herein, unless the context dictates otherwise, the terms "about" and "approximately" mean plus and minus 5%.

As used herein, unless the context dictates otherwise, the term "generally" and "substantially" mean in general terms. For example, a "generally rectangular shaped panel" means that a panel has an overall shape of a rectangle, but it does not need to be perfectly rectangular.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

What is claimed is:

1. A cabinet comprising:
a main panel defining a longitudinal axis and having a top edge;
a plurality of vertical panels positioned in a laterally spaced relationship along the longitudinal axis of the main panel and in parallel planes each of the vertical panels being orthogonal to the main panel, the vertical panels each having a top edge and a bottom edge;
hangers coupling the vertical panels to the main panel, the hangers each having:
an elongated body; and
a first end bracket at a first end of the elongated body, the first end bracket comprising a first hook that receives the top edge of the main panel and thereby supports the bracket and the coupled vertical panel to hang from the main panel, the first hook comprising a first arm spaced away from the elongated body and an intermediate portion connecting the first arm to the elongated body; and
a top panel secured to the top edges of the vertical panels and a bottom panel secured to the bottom edges of the vertical panels;
wherein either the top panel or the bottom panel holds the vertical panels against lateral movement relative to the main panel;
wherein the first arm is parallel to the elongated body;
wherein the first arm, the elongated body, and the intermediate portion are in the same plane as one another and the first arm, the intermediate portion, and the elongated body define a U-shaped channel dimensioned to receive the edge of the top panel; and
the first end bracket comprises a first receiver that receives an edge of the top panel.

2. The cabinet of claim 1, wherein:
the first receiver defines an opening direction that is orthogonal to that of the first hook.

3. The cabinet of claim 1, wherein:
the first end bracket comprises a first receiver that receives an edge of the top panel; and
the first receiver comprises a second arm spaced apart from the intermediate portion and projecting in a direction that is substantially parallel to the intermediate portion and a third arm connecting the intermediate portion and the second arm.

4. The cabinet of claim 3, wherein:
the intermediate portion, second arm and third arm define a U-shaped channel dimensioned to receive the edge of the top panel.

5. The cabinet of claim 1, wherein:
the hangers each have a second end bracket at a second end of the elongated body, and
the second end is opposite to the first end.

6. The cabinet of claim 5, wherein:
the second end bracket comprises a second hook that receives a bottom edge of the main panel.

7. A cabinet comprising:
a main panel defining a longitudinal axis and having a top edge;
a plurality of vertical panels positioned in a laterally spaced relationship along the longitudinal axis of the main panel and in parallel planes each of the vertical panels being orthogonal to the main panel, the vertical panels each having a top edge and a bottom edge;
hangers coupling the vertical panels to the main panel, the hangers each having:
an elongated body; and a first end bracket at a first end of the elongated body, the first end bracket comprising a first hook that receives the top edge of the main panel and thereby supports the bracket and the coupled vertical panel to hang from the main panel; and either one of a top panel secured to the top edges of the vertical panels, or a bottom panel secured to the bottom edges of the vertical panels;

wherein either the top panel or the bottom panel holds the vertical panels against lateral movement relative to the main panel; wherein:

the second end bracket comprises a second receiver that receives an edge of the bottom panel.

8. The cabinet of claim 7, wherein:

the second receiver defines an opening direction that is orthogonal to that of the second hook.

9. A cabinet comprising:

a main panel defining a longitudinal axis and having a top edge;

a plurality of vertical panels positioned in a laterally spaced relationship along the longitudinal axis of the main panel and in parallel planes each of the vertical panels being orthogonal to the main panel, the vertical panels each having a top edge and a bottom edge;

hangers coupling the vertical panels to the main panel, the hangers each having:

an elongated body; and a first end bracket at a first end of the elongated body, the first end bracket comprising a first hook that receives the top edge of the main panel and thereby supports the bracket and the coupled vertical panel to hang from the main panel; and either one of a top panel secured to the top edges of the vertical panels, or a bottom panel secured to the bottom edges of the vertical panels;

wherein either the top panel or the bottom panel holds the vertical panels against lateral movement relative to the main panel; wherein:

the hangers are each coupled to a corresponding one of the vertical panels by one or more couplings, each of the couplings comprising an anchor projecting from the elongated body and having a head and a corresponding keyhole hanger mounted on a side edge of the corresponding vertical panel, the keyhole hanger comprising an opening dimensioned to receive the head and a slot extending.

10. The cabinet of claim 9, wherein:

the vertical panels have recessed portions on a first side edge and;

the keyhole hangers are mounted within the recessed portions.

* * * * *